(12) United States Patent
DiMaio et al.

(10) Patent No.: US 11,347,901 B2
(45) Date of Patent: May 31, 2022

(54) FRANGIBLE SECURITY DEVICE

(71) Applicant: Tetramer Technologies, LLC, Pendleton, SC (US)

(72) Inventors: Jeffrey R. DiMaio, Pendleton, SC (US); Zachary Hunt, Simpsonville, SC (US); Yanina Breakiron, Clemson, SC (US); Baris Kokuoz, Anderson, SC (US); Bogdan Zdyrko, Clemson, SC (US); Michael A. Schreuder, Anderson, SC (US); Stephen D. Hudson, Westminster, SC (US)

(73) Assignee: Tetramer Technologies, LLC, Pendleton, SC (US)

(*) Notice: Subject to any disclaimer, the term of this patent is extended or adjusted under 35 U.S.C. 154(b) by 300 days.

(21) Appl. No.: 16/021,185

(22) Filed: Jun. 28, 2018

(65) Prior Publication Data

US 2019/0005275 A1    Jan. 3, 2019

Related U.S. Application Data

(60) Provisional application No. 62/669,418, filed on May 10, 2018, provisional application No. 62/525,817, filed on Jun. 28, 2017.

(51) Int. Cl.
| | |
|---|---|
| *G06F 21/86* | (2013.01) |
| *G06F 21/88* | (2013.01) |
| *B32B 27/08* | (2006.01) |
| *G06F 21/73* | (2013.01) |
| *B32B 27/30* | (2006.01) |
| *G06F 21/34* | (2013.01) |
| *H04L 9/32* | (2006.01) |

(52) U.S. Cl.
CPC .............. *G06F 21/86* (2013.01); *B32B 27/08* (2013.01); *B32B 27/304* (2013.01); *G06F 21/34* (2013.01); *G06F 21/73* (2013.01); *G06F 21/88* (2013.01); *H04L 9/3278* (2013.01); *B32B 2250/04* (2013.01); *B32B 2255/26* (2013.01); *B32B 2305/347* (2013.01); *B32B 2305/72* (2013.01); *B32B 2307/412* (2013.01)

(58) Field of Classification Search
None
See application file for complete search history.

(56) References Cited

U.S. PATENT DOCUMENTS

| | | |
|---|---|---|
| 5,117,457 A | 5/1992 | Comerford et al. |
| 5,137,208 A | 8/1992 | Wang et al. |
| 7,005,733 B2 | 2/2006 | Oliver et al. |
| 8,186,731 B1 * | 5/2012 | Romero ............... G09F 3/0358 292/307 R |
| 2007/0152816 A1 | 7/2007 | Koste et al. |
| 2013/0021758 A1 | 1/2013 | Bernstein et al. |
| 2014/0042628 A1 | 2/2014 | Edelstein et al. |

FOREIGN PATENT DOCUMENTS

WO      WO2011046769       4/2011

OTHER PUBLICATIONS

"monomer" definition from Britannica.*

* cited by examiner

*Primary Examiner* — Laura C Powers
(74) *Attorney, Agent, or Firm* — Burr & Forman LLP; Douglas L. Lineberry

(57) ABSTRACT

The present disclosure pertains to a tamper indicating security device, which indicates unauthorized duplication of and/or access to a variety of secure documents, technologies, products, and/or protected volumes.

6 Claims, 24 Drawing Sheets

FRANGIBLE SECURITY DEVICE

This disclosure was developed with the use of research funds from the Department of Energy ("DOE") pursuant to Grant Number DE-SC0008246 and Grant Number DE-NA0002805, both titled "Development and Commercialization of Nanocomposite Coating Technologies". The government has certain rights in the invention.

BACKGROUND OF THE INVENTION

1) Field of the Invention

The present disclosure pertains to a tamper indicating security device. The device indicates unauthorized duplication of and/or access to a variety of secure documents, technologies, products, and/or protected volumes. The present invention also relates to a polymer-based frangible authentication security system.

2) Description of Related Art

It is fundamental that businesses, federal agencies, and international groups have the ability to perceive actual or attempted unauthorized access to sensitive national security files, equipment, and materials, such as weapons systems and designs or special nuclear materials. Additionally, in a broad range of industries, it is becoming increasingly difficult to protect the banking and personal information of consumers and corporate intellectual property and to secure industrial supply chains that ensure product reliability, quality, and authenticity.

There are many available devices and techniques in the art for limiting unauthorized access to secure systems, with continuous improvements being made. But as these devices advance, so do the means for hacking and gaining access to these systems. Although significant progress has been made in the art of tamper detection, many of these systems can be intruded, hacked, or breached with tools as simple as a paperclip.

The use of novel tamper-indication mechanisms is increasing at an accelerating pace and many useful technologies have been recently developed to preclude spoofing of security seals such as the chaotic Prooftag™ and authentication codes that are revealed when breathed on. Unfortunately, in this security arms race, counterfeiters have already developed numerous methods for liftoff and replacement of anti-counterfeit labels such as these. Another disadvantage of common security coatings and paper/tape labels is that an attacker can use small, needle-sized holes to tamper with a seal while leaving the authentication elements intact. The security measures disclosed herein have the same potential for spectrally engineered optical fingerprints as security inks, but also the unique ability to deposit frangible 3D monolithic, one-piece, unbroken coatings that can indicate a breach of any size on a seal. This unified approach is a major advantage over current security tapes and paper labels.

Other references include a variety of security techniques, including ones that utilize various optical effects, such as holograms and covert fluorescent marks. These are well known and remain relatively easy to detect and duplicate. Some methods make use of brittle tapes, stickers, or packages that irreversibly shatter, tear, or stretch during a tampering event so that duplication of said material is difficult. Other methods include the use of electromagnetic radiation, a material to propagate the radiation, and a detector to detect a loss of signal to indicate a tamper event. Each of these methods has various strengths and weaknesses.

U.S. Pat. No. 5,117,457, Comerford, et al., describes a tamper-resistant package that protects information stored in electronic circuitry. The '457 patent discloses the use of optical energy to protect the circuitry. The energy is applied to an energy distribution system and sensing means are used to detect an intrusion into the system. The energy distribution system described makes use of a plurality of predefined paths to comparatively sense when an intrusion has taken place. The current disclosure is distinct from the '457 disclosure as the current disclosure does not use predefined paths to sense an intrusion, but instead uses a random distribution of light across a single waveguide or multiple waveguides or in some instances does not require wave guiding to detect intrusions.

U.S. Pat. No. 7,005,733, Kommerling et al., describes an integrated circuit device that protects circuit assemblies from tampering. The device consists of a protective member to reduce access to the circuit and a circuit device that uses "a decryptor to access data stored in encrypted form." The current disclosure is distinct from this system as it is not an integrated circuit device that makes use of encryption values and does not encrypt or decrypt any of the protected data. More importantly, the current disclosure uses a unique path for propagation, specifically a pre-stressed film. The pre-stressed nature of this propagating material is a significant improvement over the invention described in the '733 patent.

U.S. Pat. Pub. No. 2007/0152816, Koste et al., describes a tamper detection system that includes at least one optical energy transmitter, a material for transmitting optical energy, at least one support structure adjacent the energy transmitting layer, and at least one detector for detecting a change in energy distribution within the material. Tampering with this system creates a hole through the material, which can reduce the amount of radiation detected. The current disclosure is distinct from the '816 publication because the pre-stressed films employed by the current disclosure not only absorb the energy from penetration but also respond by creating a crazed or cracked pattern throughout the material. Thus, even a minor intrusion shatters the film, guaranteeing a loss in signal, even when the intrusion is outside of a light-propagating path.

U.S. Pat. No. 5,137,208, Wang et al., describes a package that consists of a photopolymerizable polymer coating that is irreversibly altered during a tampering event. The material is frequently described as "extremely brittle" and shatters or fractures when tampered with. However, there is no disclosure of employing light paths to indicate an intrusion event nor a description of predefined crack patterns. Moreover, Wang '208 requires that its photopolymerizable polymer is located on an exterior of a packing product in order that any intrusion event would provide "a readily visible indication" of tampering. (Abstract.)

Security measures for high value goods are a pre-requisite in any industry, especially as security threats continue to advance in skill and complexity. Various security issues hamper movement of high-value goods such as fine art, jewelry, electronics, pharmaceuticals, alcohol, high-end apparel, food, and specialized auto parts. Sophisticated thieves have numerous ways of accessing high value goods. They cultivate inside sources or observe patterns in high-value goods supply chains, then arrive at pickup facilities with enough information to appear legitimate, making off with whole shipments or "cherry picking" select high value items.

A variety of regulations, technologies, and best practices are helping high-value goods shippers deliver cargo. The foremost facilitator is speed. Using expedited services and direct routes minimizes touch points and dwell time: the two most vulnerable areas. Technological advances have also made a significant impact on security. Route planning and risk analysis tools, for example, help ensure shipments are assigned the right level of security. Predictive modeling—reviewing loss rates by shipment and product—allows one to forecast expected losses for protected versus unprotected cargo, so customers can allocate security resources accordingly. Heightened supply chain visibility helps logistics managers ensure high-value goods arrive where they should be, when they should be there. The ability to easily communicate with trading partners and Customs officials online makes it easier to spot deviations from expected patterns. These innovations in combating theft of, or interference with, high-value goods means these supply chains can operate wherever the market takes them, regardless of the risk level involved.

A layered approach is the best way to secure high-value goods. The right combination of planning, processes, contract language, packaging, and monitoring helps ensure goods reach their intended destinations. Measures to boost security may include expedited service, dedicated trucks, team drivers, covert and overt GPS, split shipments, couriers, auditing partners, and careful timing, such as avoiding shipping during weekends and holidays.

Even in view of the above safeguards, physical security of high value goods remains a paramount concern. One key element is making sure high-value goods are properly prepared for transit such as by using corner boards, strapping, banding, and shrink-wrapping to protect its products in transit. Cargo seals also serve as a deterrent from theft and interference of high value items.

Cup and loop seals are ubiquitous in the safety and security market. They provide tamper-indication for closures as well as some authentication features such as barcodes, serialized numbers, or patterns. This type of seal is not typically intended to prevent entry to a closure, but rather to indicate surreptitious access or entry; although, there are more "secure" seals that make unauthorized access more difficult than simple tamper-indicating seals.

High-security authentication schemes are often developed around Physically Unclonable Functions (PUFs) of a system wherein an intrinsic characteristic or feature of the system is used to create a fingerprint that uniquely identifies and authenticates the item. Functions could be electrical, magnetic, structural, optical, etc. in nature, each with their own method for analysis and evaluation.

Optical PUFs have been demonstrated by dispersing reflective particles in a transparent medium which is then scanned with a laser. The dispersion of the particles is random and the interaction of the laser with the particles is very complex, resulting in a scattering pattern that is extremely difficult to reproduce. However, more stringent security measures that are easier to implement in the field are needed to combat theft and ensure protection of products in transit against sophisticated and subtle intrusions.

What is needed in the art is a way to prevent circumvention of security techniques in order to safeguard information or deny access. The present disclosure aims to improve upon the art by implementing a pre-stressed film into a planar wave guiding system for enhanced tamper detection. The pre-stressed nature of the film allows for enhanced detection due to a frangible response in the material upon penetration or tampering with the film. Accordingly, it is an object of the present invention to address the shortcomings of prior systems by combining the benefit of a pre-stressed, frangible film into a planar wave guiding system that detects a tamper event or surface penetration when the detector registers a change in signal. This system utilizes the unexpected benefit of advanced tamper detection while maintaining strength against false positive signals. Further, it is an object of the present invention to provide a structural and optical PUF wherein a polymer material in a frame's reservoir cracks in a non-predetermined pattern that is unique for each seal and possesses unique physical and optical features.

SUMMARY OF THE INVENTION

In one embodiment, a securing device is provided. The securing device may include a prestressed, frangible security coating, the security coating may waveguide, at least, visible, ultraviolet, or infrared light, and upon penetration of the coating, the prestressed nature of the coating may form a crack or crack pattern throughout the security coating, whereupon after the crack or crack pattern forms in the security coating, light intensity wave guided through the security coating either increases or decreases, regardless of the location of the penetration. Further, the security coating may be adhered to a solid, nonflexible substrate. Still further, the security coating may be optically transparent. Further yet, the security coating may comprise at least two sequentially deposited and cured layers. Further still, the device may have a clad layer that includes a thickness greater than 2 microns, in a further embodiment, the thickness may be greater than 75 μm, a polymer made from a mixture of SR 508 or Efiron with TPO, and the TPO is between 0.0 and 3% w/w of the mixture, and a transmitting layer between 75 and 250 μm thick. Additionally, a transmitting layer may comprise, a thickness greater than 75 μm, a polymer made from a mixture of SR350 and TPO, and the TPO is between 1-10% w/w of the mixture. Additionally still, light may be wave guided in a planar fashion.

In another embodiment, a system for securing materials is provided. The method may include a prestressed, frangible propagating material that may transmit light in a planar fashion, a light source, and a detector. Additionally, the light source may be directly coupled to the system. Further, the light source may be directly coupled to the system via a prism or a dye. Still further, the light source may be indirectly coupled to the system. Additionally further, the light source may be indirectly coupled to the system via scatterers or a prism. Moreover, the prestressed, frangible propagating material may become prestressed after being polymerized with a radiation curing. Additionally still, the prestressed, frangible propagating material may form a crack or crack pattern upon an intrusion event into the prestressed, frangible propagating material and light intensity wave guided through the prestressed, frangible propagating material drastically increases or decreases regardless of where the intrusion event has occurred. Moreover yet, the intrusion event may be a penetration into the prestressed, frangible propagating material.

In a still further embodiment, a security device providing an intrusion warning system is provided. The system may include at least one layer comprising at least one frangible material, wherein an intrusion event into the at least one layer forms a known pattern within the at least one frangible material. Still further, multiple layers of frangible material may be included within the security device and multiple, distinct patterns may be produced in response to an intrusion event.

In an additional embodiment, a security device is provided. The security device may include at least one layer comprising at least one frangible material, wherein penetration of the at least one layer may form a recognizable pattern used for authentication. Further, multiple layers of frangible material may be included within a single security device with distinct and/or complementary patterns. Further still, a pre-cracked layer or coating with a random crack pattern may be used for unique identification, such as visual or image comparisons.

In a still further embodiment, a security device providing an intrusion warning system is provided. The warning system may include at least one layer comprising at least one frangible material, wherein the at least one layer comprising at least one frangible material may form an inner layer between at least two outer layers, and an intrusion event into the at least one inner layer forms a known or random pattern within the at least one frangible material. Still further, the at least two outer layers may be composed of flexible materials. Yet additionally, the at least two outer layers may be composed of PET, PE, or PVC. Still yet, the at least two outer layers may be composed of PET and the inner frangible layer may comprise SR 350, SR 351, and/or a photoinitiator such as TPO between 0.5 and 10% by weight. Further still, the inner layer sandwiched between the at least two outer layers may not be frangible until UV or thermal curing makes the inner layer frangible. Still yet, the entire structure may be flexible before and after curing. Additionally, the entire structure may be flexible before curing but at least a portion of the entire structure may not be flexible after curing.

In a still further alternative embodiment, an authentication device is provided. The device may include a frame, an internal reservoir disposed within the frame, an uncured polymer or monomer may be disposed within the internal reservoir, wherein the polymer may become frangible upon being cured, and at least one end of a security loop may be disposed within the polymer. Further, the polymer may be cured to form a cracked three dimensional identification scheme. Additionally, light may be distorted in a unique fashion by the cracked three dimensional identification scheme. Still further, removal of the at least one end of the security loop disposed within the polymer may change the three dimensional identification scheme of the device. Yet still, the frame may be transparent. Still additionally, dyes, metal particles, pigment particles, or other randomly-distributed authentication features may be dispersed within the polymer prior to curing. Additionally, the polymer may interdigitate with the at least one end of the security loop.

In a further alternative embodiment, a method of creating an authentication device is provided. The method may include forming a container for an uncured polymer, inserting at least one end of a security device through a wall of the container and into the uncured polymer, curing the polymer; and wherein curing of the polymer results in the polymer cracking and forming a frangible three-dimensional pattern in the cured polymer. Additionally, light may be distorted in a unique fashion by the cracked three dimensional identification scheme. Additionally still, removal of the at least one end of the security device disposed within the polymer may change the three dimensional pattern in the cured polymer. Still yet, the container may be formed to be transparent. Still additionally, the method may include dispersing dyes, metal particles, pigment particles, or other randomly-distributed authentication features within the polymer prior to curing. Still yet additionally, the method includes imaging the frangible three-dimensional pattern. Additionally, imaging may be performed at multiple angles with respect to the authentication device. Yet additionally, the method may include imaging a fingerprint formed on the authentication device to form a two-factor authentication device. Further, the polymer may interdigitate with the at least one end of the security device. Further still, the method may include forming a physical barrier, a randomly formed unique ID, and a three dimensional tamper indicating pattern via the cured polymer. Yet further still, the authentication device may be translucent yet appears hazy when viewed from an angle that is perpendicular to a face surface of the authentication device.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

Figure 1:
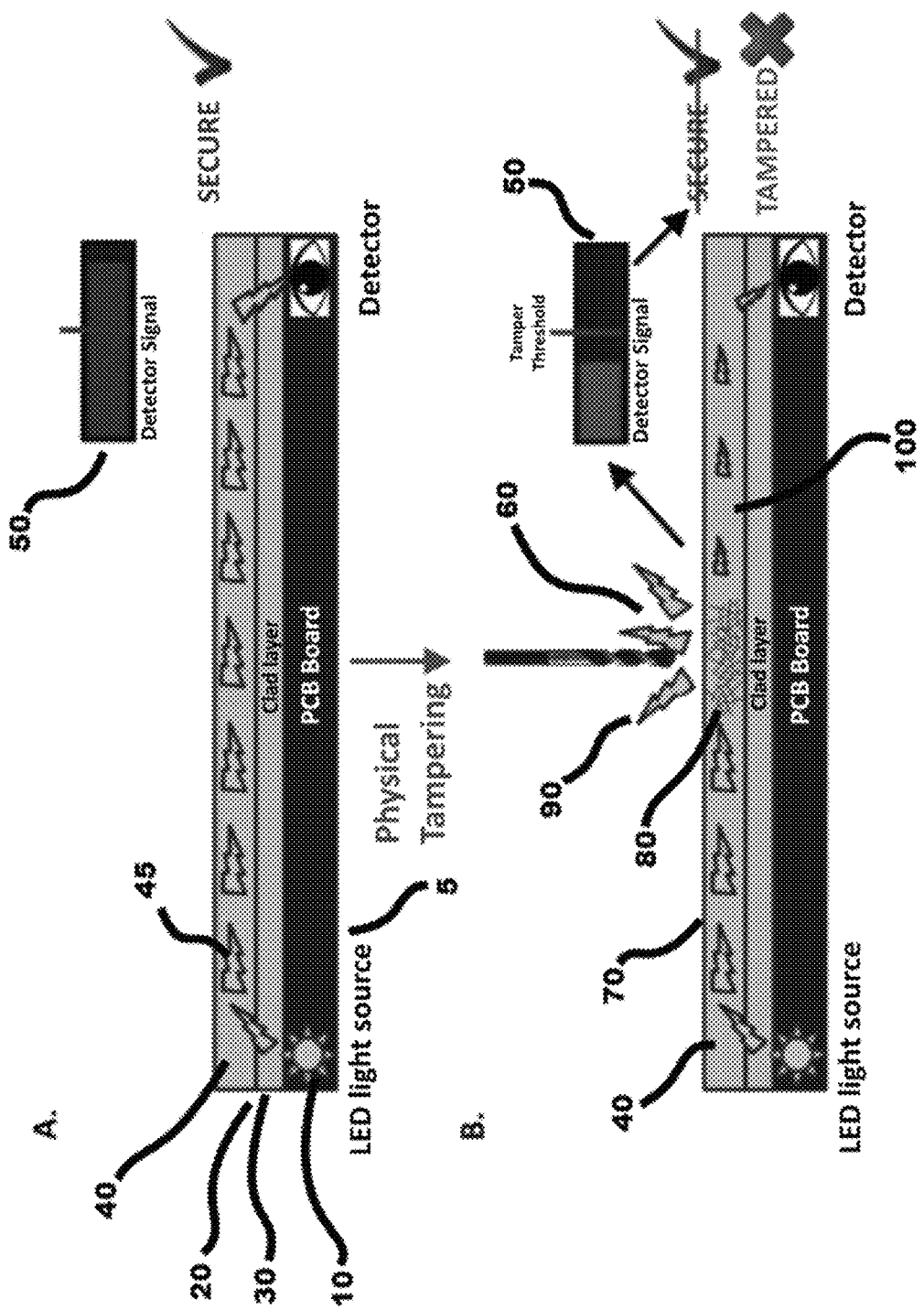
FIG. 1 shows a diagram of one embodiment of a security coating of the current disclosure.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The current disclosure provides a unique technology which allows the production of pre-stressed frangible, wave guiding polymeric coatings. These can be applied using standard thin-film coating techniques and UV curing. The ability to produce stable, pre-stressed films allows for superior tamper indicating coatings as the films not only crack in the area where the coating has been breached, but across the entire surface of the coating.

Frangible coatings can be used for tamper indication in at least two ways. If the film is stable, cracking is an indication of surreptitious intrusion, in the form of a tamper plane. If the film cracks on cure, then a unique pattern from the random propagation of cracks can provide a unique ID for the particular sample.

The stability and surface adhesion of the frangible coating may be controlled by varying formulations, (adding solvent, varying the oligomer type and content, varying the photoinitiator type and content), varying the curing conditions (wavelength of light used for curing, temperature during cure, intensity of light for curing, total dose of light during curing) and also using different base polymer substrate materials including but not limited to various types of UV-curable acrylates. Stabilized tamper planes encased between two layers of nanocomposite may also be employed, using layered acrylate composites as well as Perfluorocyclobutane (PFCB) based nanocomposites. Stabilized tamper planes encased between two layers of packaging materials may also be employed, such as PET, PE, or PVC.

For tamper indication, the residual stress, mechanical properties, and overall composite structure must be optimized so that the film will not crack prematurely, but will crack on any attempt at physical intrusion. In one embodiment, introduction of fluorescent nanoparticles, dyes, or metal chelates into the tamper plane or the substrate may provide for easy crack pattern identification.

Depending on the material used, cracks formed in the material may be finer than the resolution of the human eye but any cracks in the material may act as waveguides to concentrate the fluorescence emission and will become visible upon inspection. This type of coating could be used for both coatings that are purposely cracked on installation to create a random pattern for flicker analysis and for crack-on-tamper coatings that break during attempted surreptitious access.

The current disclosure has achieved considerable progress in development of frangible tamper plane films. Frangible behavior is a result of residual stress which is released upon perturbation, creating a catastrophic failure of the material. For curable polymers, the material must be brittle, and shrink on cure. The failure mode must also favor cracking over delamination. Both of these modes happen, and thin films tend to delaminate very easily. This is dependent on the cohesive strength of the material compared to the strength of the adhesion to the substrate; in order to promote cracking behavior over delamination, it is necessary to make sure the adhesion between the frangible layer and the substrate is strong.

Integration of sensors as disclosed herein may enable real-time analysis of stored stress and coating vitality and could be used with: intermodal containers; chain of custody situations; supply chain verification; pharmaceutical shipments; anti-counterfeiting of consumer goods; authentication/verification for high-end electronics; authentication of wines/spirits; supply materials for security coatings; deposit coatings for customers; as well as providing coated surfaces with inherent security/detection measures.

In one embodiment, the security layer may comprise acrylate film materials, for example alkyl acrylates and alcohol acrylates. Curing of the acrylate films may be accomplished using an exposure of high intensity UV radiation of 10 minutes or less, in a further embodiment, a six (6) minute exposure of high intensity UV radiation may be employed. A UV cure initiator, such as for purposes of example only, diphenyl(2,4,6-trimethylbenzoyl)phosphine oxide (TPO), may be added at 3 wt %. The rate of cure is dependent on the exposure time, which means that the frangible layer can remain soft for a determined amount of time before the curing advances far enough to build up the residual stress necessary for frangible behavior. Acrylates may also be cured using thermal initiators, which adds flexibility for the choice of processing method on their own. The material found to have the best stability while still cracking when perturbed was a silicon resin, for example, SR 350, an acrylate resin available from Sartomer Acrylates.

In a further embodiment, the disclosure provides encapsulated frangible layers which may prevent surface defects from causing cracks and may result in more stable coatings. Encapsulation also increases the amount of residual stress generated in the bulk of the material, since less shrinkage is possible. The ultimate crack density should be higher as a consequence.

Another major finding of the current disclosure was that there is a minimum film thickness for cracking to occur. If the film is too thick, the residual stress will be too large as the bulk shrinks, and the acrylate film will crack on cure. When the film is too thin, it is more difficult for cracks to propagate long distances through the bulk material, and delamination occurs. Using uncovered samples of SR350, this optimal thickness range was found to be between 25 and 650 microns. In a further embodiment, the range may be between 50 and 250 microns. In an even further embodiment, the range may be between 125 and 175 microns. Sandwiched layers may achieve lower thicknesses than this.

The current disclosure also provides multiple security features. The current technology may be used in various ways. For instance the production of films that catastrophically fail allows for three types of products be developed: (1) frangible wave guiding coatings including an LED and sensor to detect penetration of the coating; (2) single-use authentication tokens with predefined crack patterns; and (3) frangible coatings or sandwich substrates which clearly and obviously demonstrate when they have been physically breached.

Another aspect of the current disclosure provides a tamper indicating coating technology which can be applied quickly and robustly to a variety of application-specific surfaces, ensuring few false accusations/misfires while providing reliable and consistent evidence of a breach or clear authentication of products. For all of the proposed applications, the system of the current disclosure will provide reliable and consistent tampering indication and authentication.

FIG. 1 shows a diagram of one embodiment of a security coating of the current disclosure. As FIG. 1 shows at illustration A, a light source 10, which may a LED or other type of light source, and may be integral or separate from the security film provides a source of light that transmits through the at least one layer of security coating 20. The light source may be directly or indirectly coupled into the system. Direct or indirect coupling refers to how the light is produced within or outside the layer. For example, when an LED is directly placed in the layer or touching the layer, this is defined as direct coupling into the layer. When a light source is not touching the layer and light is directed into the layer via another item (such as a prism), this is defined as indirect coupling. Indeed, light source 10 may be coupled using a prism or dye. The prism will redirect the light such that it is at the correct angle to be waveguide by the system. The dye can be put directly in the layer, producing light within the layer at the correct angles to be waveguide (at least some of the light it produces) and any fluorescent material should be suitable. In a further embodiment, light source 10 may be indirectly coupled. Indirect coupling may be accomplished by using scatterers and prisms. For purposes of example only and not intended to be limiting, a scatterer is defined as a material or structure which scatters light, one example is $TiO_2$ nanoparticles, but other compounds may be employed as scatterers.

In a further embodiment, light source 10 may be located within security coating 20. Security coating 20 may be formed over a substrate, such as a printed circuit board 5. In one embodiment, security coating 20 may be formed from at least two layers. A lower "Clad" layer 30 and a frangible, light transmitting layer 40. In wave guiding, "clad" is a common term used to describe a lower refractive index material surrounding the "guiding" layer (also called the transmitting layer). The difference in refractive index is what determines the efficiency of the wave guiding. The frangible, light transmitting layer is the "guiding" layer described above, and the layer which is stressed and cracks upon intrusion. This cracking is what causes a decrease in the amount of light transmitted by this layer. In one embodiment, this layer may be SR350 with a photoinitiator, after curing. In a further embodiment, light source 10 may be located within frangible, light transmitting layer 40. The amount of light 45, which may be light of any measurable spectrum including visible, infrared, etc., passing through layer 40 may be detected by sensor 50. The amount of light 45 transmitted through frangible, light transmitting layer 40 is known once the security coating 20 is applied. Further, security coating 20 may be formed to be transparent or opaque depending on the level of security preferred for a particular use. Further, frangible, light transmitting layer 40 may transmit light in various directions and orientations. In a preferred embodiment, frangible, light transmitting layer 40 may transmit light in a planar fashion.

As FIG. 1 shows at illustration B, an attempt 60 has been made to penetrate the frangible, light transmitting layer 40. Attempt 60 results in the substrate 70 of frangible, light transmitting layer 40 cracking or crazing 80. This cracking or crazing 80 allows light 90 to escape from the frangible, light transmitting layer 40. This, in turn, causes a different amount of light 100 (as compared to amount of light 45) to be measured by detector 50, thereby indicating that a tampering event has occurred. In a further embodiment, the light intensity transmitting through the frangible, light transmitting layer 40 may be increased or decreased regardless of where a tampering event has occurred in frangible, light transmitting layer 40.

In a further embodiment, security coating 20 may be formed from at least two sequentially deposited and cured layers. Clad layer 30 may be thicker than 75 µm, such as 200

μm. Clad layer 30 may be formed from a mixture of a acrylate resin, such as SR 508 available from Sartomer Acrylates, or a mixtures of a coating agent, such as Efiron from SSCP Corp. (Korea) with a photoinitiator, such as Diphenyl(2,4,6-trimethylbenzoyl)phosphine oxide (TPO). Other photoinitiators may also be used such as BAPO or CIBA369, or others as known to those of skill in the art. In one embodiment, 0.0 to 2% TPO, in a further embodiment from 0.5 to 2% TPO, may be used for the clad layer because the RI remains low, which increases the difference between the RI of the clad and the RI of the transmitting layer, thereby increasing the wave guiding properties as discussed above.

In a further embodiment, the TPO may be from 0.5 to 3% w/w of the mixture. Still further, frangible, light transmitting layer 40 may be between 100 μm and 250 μm thick. Frangible, light transmitting layer 40 may be prestressed, such as via curing via UV light, visible light, e-beam radiation, or other methods as known to those of skill in the art. Frangible, light transmitting layer 40 may be formed from a mixture of acrylate resin, such as SR350 or SR 351 from Sartomer Acrylates, and a TPO as a photoinitiator. The TPO in the transmitting layer may comprise 1-10% w/w of the mixture. One critical feature of the current disclosure is that upon penetration of the frangible, light transmitting layer 40, the layer will create a crack or crack pattern. Indeed, the pattern of cracks may be programmed by variations in the curing intensity, formulation patterning, and curing times.

In a further embodiment, a second type of product may be produced. For instance, Frangible Indication of Tampering (FIT™ frangible film) Coatings, may provide a pre-stressed frangible coating which can be applied to a greater variety of surfaces on products based on the same coating materials and processing as the LightShield™ technology illustrated by FIG. 1 but without the active monitoring hardware and light coupling/decoupling components in the frangible layer. In this embodiment, coatings will be produced which have a pre-defined crack pattern that may create greater difficulty in spoofing coating.

The first line of defense in detecting altered or counterfeit goods is often a tamper-indicating label or seal. The majority of current seals are designed to provide evidence when a container or package has been fully opened; however, tampering by pin-hole entries may not be detected. The security coating disclosed herein fractures, cracks or crazes if a package or container has been penetrated, even by a small pinhole attack. This embodiment would protect brand owners from diversion of their products by "lift-off" or "remove-replace" methods used for currently existing tamper-indicating labels.

In another embodiment, a Frangible Authentication Challenge Token (FACT™ chip) may provide an extremely low cost physical authentication token for a wide range of products where consumers wish to ensure their product is not counterfeit. This can cover a wide range of goods from wine and spirits to medicines. These challenge tokens will allow for a fast, easy, color-coded authentication process through the use of pre-defined crack patterns.

Figure 2:
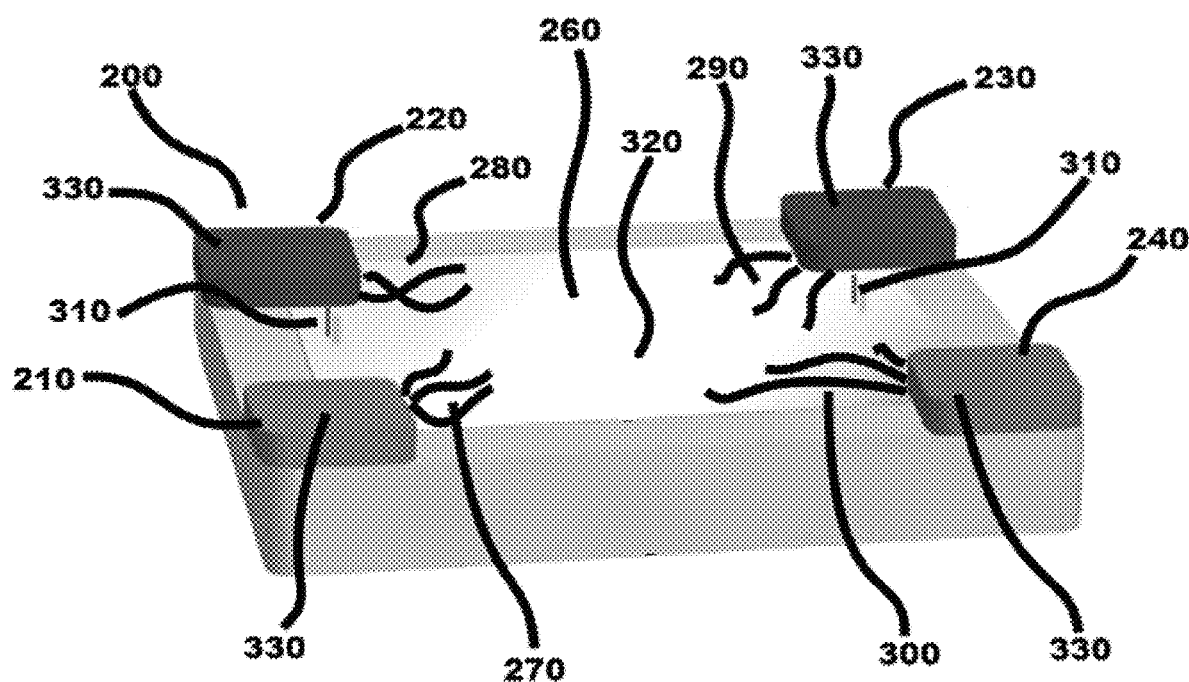
FIG. 2 shows one embodiment of a security token of the current disclosure.

There is a market need for films which can be cracked to produce a unique identifying code. As FIG. 2 shows the FACT™ chip concept is based on a small plastic chip 200 (which may be of varied sizes and shapes, such as circles, arcs, parallelograms, polygons, irregular shapes such as fauna, flora, etc., but in one example is approximately a 1.5" by 1.5" rectangle with four corners 210, 220, 230, 240) that has an inner FIT™ frangible film 260 with four pre-defined crack patterns, 270, 280, 290, and 300 which correspond to the respective corners of the chip 200, which can be revealed when the film is punctured at each corner, respectively. As shown in FIG. 2, each corner may be tagged or identified with an identifying marker 330 to distinguish it from the other corners. In one instance, a color coded button with a sharp needle 310 underneath is pushed and needle 310 initiates the fracture of substrate 320 of frangible file 260, thereby creating a specific frangible pattern, see 270, 280, 290, and 300, allowing a consumer to press corners one at a time, or together, to reveal different patterns.

In a further embodiment, in order to authenticate a product, the user may use an app on their handheld device that will prompt them to press a specific marker 330 on the FACT™ chip 200. After pressing that button and imaging the resulting fracture pattern with the app, the app will recognize the specific crack pattern from a database and pull the crack pattern images with the identifying marker 330 at each corner 210, 220, 230, and 240, wherein the markers may be color, shape, size, texture, etc. At this point the product has been matched to a database but the user has not challenged and confirmed its authenticity.

To "challenge" the authenticity of the item, the user can choose another corner marker 330 on their own, cracking a second pattern (such as first selecting corner 210 and activating its pattern 270 then selecting corner 220 and activating its pattern 280) without communicating to the app the corner and/or marker 330 chosen, and verify that the app displays the correct image and marker 330 correlation. Several iterations of this authentication process with different levels/number of challenges and confirmations are considered within the scope of this disclosure. Other ways to employ this embodiment would be to have handlers crack a specific color and scan in an image to the app at strategic points in the supply chain to authenticate the product during transport.

This embodiment may be made exceedingly cheap in large production using standard commercial methods. Because film 260 is not designed to prevent an attack and will be on a similar substrate, the coating process is greatly simplified. Crack pattern coding can be performed by replacing the laser on a laser cutter/engraver with a focused UV LED. The low cost of this embodiment allows it to be used to authenticate common items where the supply chain is difficult to validate. Brands that may benefit from this technology include Nike®, who has been very aggressive in protecting its brand. Because each token must be loaded into an "official" database, production of unofficial, "third shift" runs, as has been a documented problem for Nike®, can be prevented. Further, the simplicity of the token and authentication process encourages users to participate in the verification process with minimal effort.

The coating system of the current disclosure will enable the application of a 'one-time use' authentication code to a label or packaging as an additional layer of anti-counterfeit security. This single use code can be "destroyed" by adding a secondary crack pattern to the token that obscures the original code. There are currently no low-cost methods to provide reliable, disposable Challenge Tokens on the market, such as those disclosed via FIG. 2, but the value of this concept has been validated by industry. The Challenge Tokens can be produced for less than 15 cents in materials cost but it can supply multiple levels of authentication.

To form the frangible, light transmitting layers of the current disclosure extensive time was spent developing the preparation process of frangible films that produces films with consistent physical characteristics, such as film thickness, air bubble absence, and frangibility. A bird-bar casting procedure showed stabilized film thickness uniformity among frangible film samples in conjunction with the UV-oven for curing. It was also shown that oxygen inhibition plays a great role in the curing process. Filling the UV-oven with gases such as nitrogen or argon is essential for full cure and minimized cure time and air bubbles. The oxygen inhibition issue, however, may be abated in curing of frangible films in a sandwich structure or through modifications to the material formulation.

Figure 3:
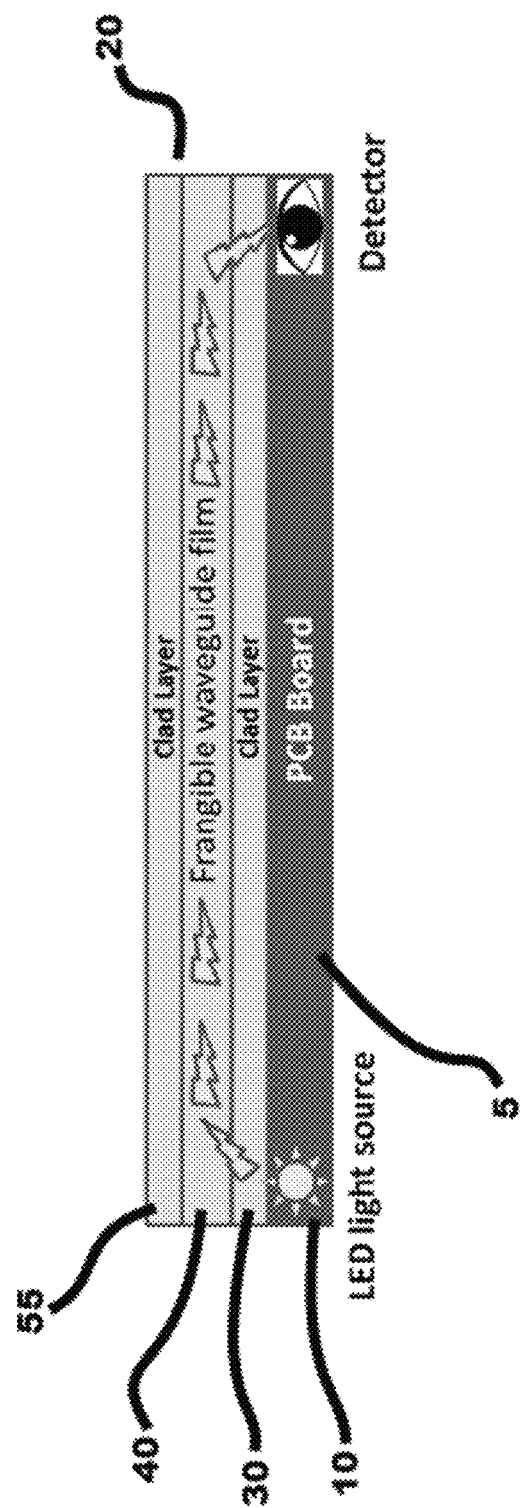
FIG. 3 shows an alternative arrangement wherein a triple layer construct may be used with a top cladding layer added to provide physical protection against external impacts.

FIG. 3 shows an alternative arrangement wherein a triple layer construct may be used with a top cladding layer 55 added to provide physical protection against external impacts. In commercial applications for frangible waveguides, it is likely that a protective environmental coating will be required on top of the frangible coatings. In one embodiment, a triple-layer coating was fabricated on a polyurethane coated PCB, see FIG. 3, with ~120 um low refractive index (RI) acrylate as the bottom clad layer 30, ~150 um thick high RI acrylate as the frangible light wave guiding layer/light transmitting layer 40, and ~140 um thick low RI acrylate as the top cladding layer 55. Prior to penetration, this sample was robust to a variety of impact testing methods, particularly dropping a steel ball weighing 8.3 grams from 1 meter height multiple times with no visible damage. In a further embodiment, security film 20 may be encased in a polyolefin envelope, not shown, surrounding the multilayer construct.

Testing of the sample shown in FIG. 3 revealed that when penetrated with a 1/16 inch drill bit or 18G needle, the samples showed clear franging beyond the penetration point, a few large scale cracks, and clear signal changes at the detectors. Further experimentation could enable Tetramer to produce structure-property maps for with parameters including thickness and composition of each layer and properties including impact stability, franging, and wave guiding efficiency.

Dyes may be used to couple light into the wave guiding layer. Further, photo initiators may also be employed in the security coating for curing. Photo initiators may include LTD, TPO, BAPO, CIBA 369, and DMHA. Genocure LTD is a 1:1 blend of DMHA and TPO.

Figure 4:
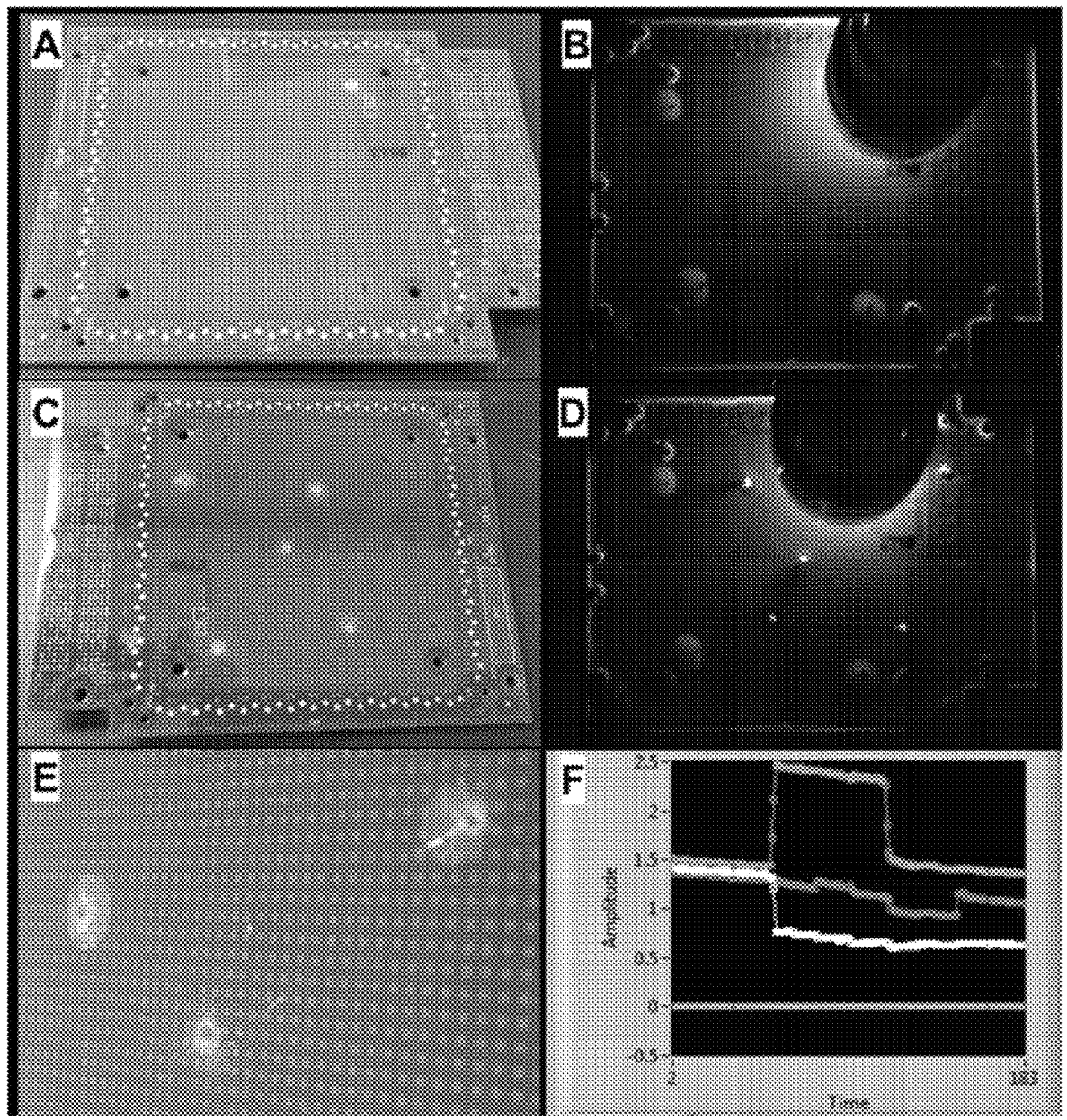
FIG. 4 shows images of a printed circuit board coated with triple-layer frangible waveguide (A, C, E) under room light and (B, D) in dark with UV flashlight as excitation source of light coupler.

FIG. 4 shows images of a PCB board coated with triple-layer frangible waveguide (A, C, E) under room light and (B, D) in dark with UV flashlight as excitation source of light coupler. Images of the PCB were taken (A, B) prior to penetration and (C, D) after franging. (E) Close up image of the penetration points demonstrates the franging extending beyond the actual physical penetration hole. (F) Detector signals collected during penetration testing.

Figure 5:
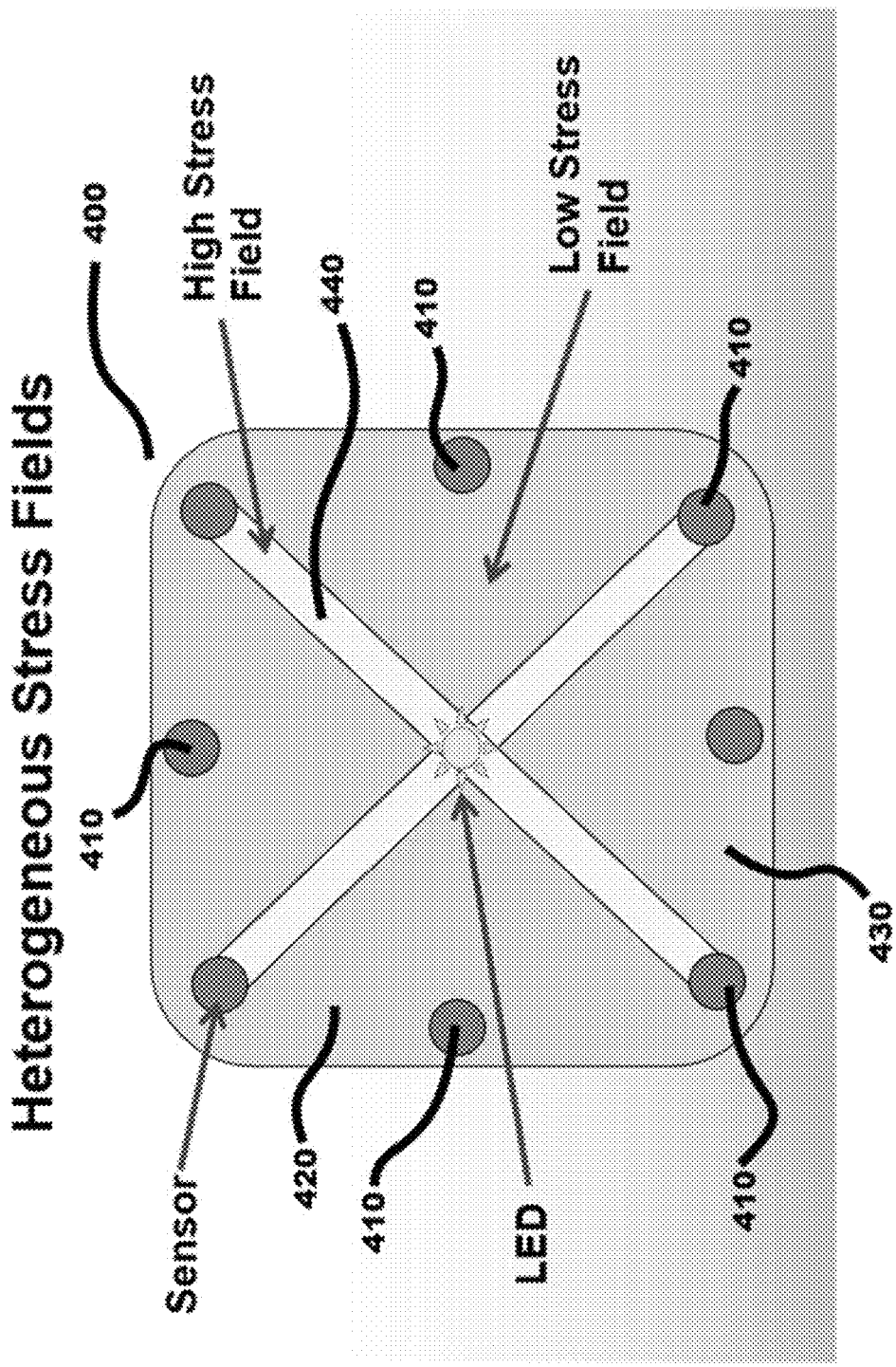
FIG. 5 shows an alternative embodiment of a security coating of the current disclosure employing multi-band frequency transmission via a multiple LED sensor arrangement.

In a further embodiment, see FIG. 5, the current disclosure may provide multi-band frequency transmission via a multiple LED and/or sensor arrangement 400. In this embodiment, multiple sensors 410, which may be a single LED or multiple LEDs, transmit complex signals regarding the light transmission through substrate 420. This allows for multi-spectral signal transmission and may be coupled with various colored LEDs and/or dyes to form complex spectral fingerprints for substrate 420. Moreover, differing areas of stress may be formed within substrate 420 to via heterogeneous stress field coatings such as a first stress coating 430 and a second stress coating 440, wherein the two stress coatings have differing internal stresses. This combination of high and low stress gradients in pre-determined areas can provide intrusion location information and improve the overall stability of coatings. For instance, one area may have high stress/low stability, surrounded by a low stress/high stability area. In another embodiment, a reverse configuration is possible with one or more low stress/high stability areas, surrounded by a at least one high stress/low stability area(s), as well. Indeed, sensors 410, or additional sensors (not shown), may be integrated into the construct to provide real time analysis of stored stress and coating vitality. In one embodiment, real time monitoring sensors may be placed in both the high stress area as well as the low stress area to provide immediate information regarding an intrusion event. For purposes of example only, if a sensor in a high stress area triggers but neighboring sensors in a low stress area do not, this may be indicative of an intrusion event occurring. Contrarily, if sensors in both areas, or simply the low stress areas, trigger, this may be indicative of a catastrophic failure rather than an intrusion event.

Figure 6:
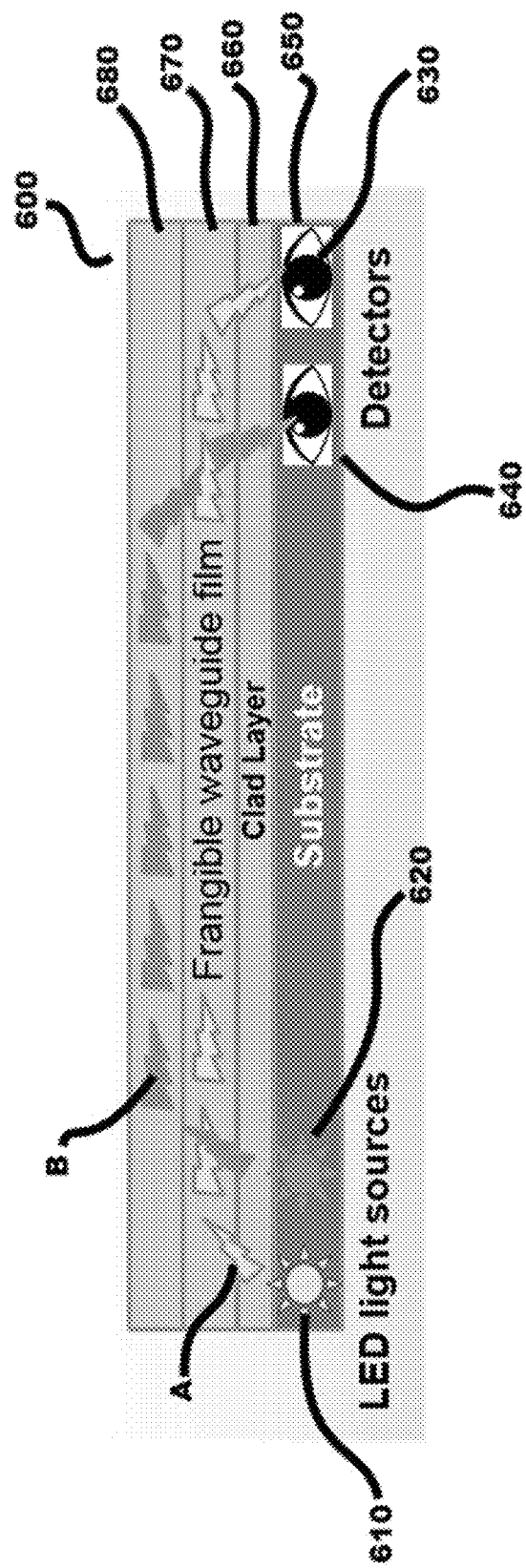
FIG. 6 shows a further alternative embodiment of the current disclosure which employs a multiple layer/multiple LED construct.

Further, a multiple layer/multiple LED construct 600 may be formed as shown in FIG. 6. Indeed, multiple LED light sources 610 and 620 may be used in conjunction with multiple detectors 630 and 640 to analyze the waveguide properties of construct 600. For example, different types of light may be emitted through different layers of construct 600 as shown in FIG. 6, wherein light type A may transmit through layer 670 and light type B may transmit through layer 680, wherein A and B may be entirely different spectrums or wavelengths of light. Further, combinations of layers 650, 660, 670, and 680 may all be made frangible, such as all are frangible, only 650 and 670 are frangible, only 660 and 680, only 650 and 680, etc., in order to determine the depth of an intrusion into the construct 600. A construct such as 600 allows for not only depth profiling but allows for combinations of multi-band and multi-spectral techniques for detecting incursions into the construct 600.

Figure 7:
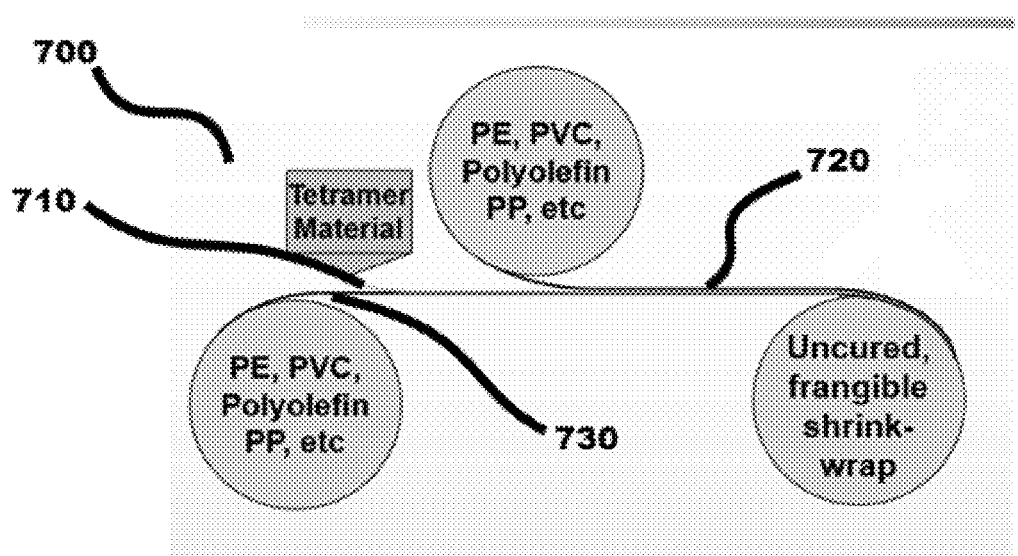
FIG. 7 shows one embodiment of a processing method wherein a security material of the current disclosure is placed between, or sandwiched within, a first layer and a second layer via roll-forming techniques.

FIG. 7 shows one embodiment of a processing method 700 wherein a security material 710 of the current disclosure, as described supra, may be placed between, or sandwiched within, a first layer 720 and a second layer 730 via roll-forming techniques as known to those of skill in the art. Layers 720 and 730 may comprise polyethylene, polyethylene terephthalate, polyvinylchloride, polyolefin, propylene, etc., wherein the layers 720 and 730 may be the same polymer or different polymers from one another. In one embodiment, security material 710 may be cured between to polyolefin sheets wherein the polyolefin sheets are between 470 μm to 750 μm thick.

Processing method 700 may be a roll-to-roll fabrication method of uncured films. This process would reduce false positive stress concentrators such as dust, particulates, etc., by forming the security material between the sandwiching layers and thereby significantly reducing the introduction of such foreign materials to the security material, which may later lead to false positive intrusion indicators whereby the dust or foreign object triggers the frangible nature of layer 710. Further, the sandwich security film may then be stored and activated at a later date, such as when the security materials will be applied to a package, label, container, etc. This would produce a conformable frangible coating that could be employed with a wide variety of shapes and sizes with respect to the items being secured.

Figure 8:
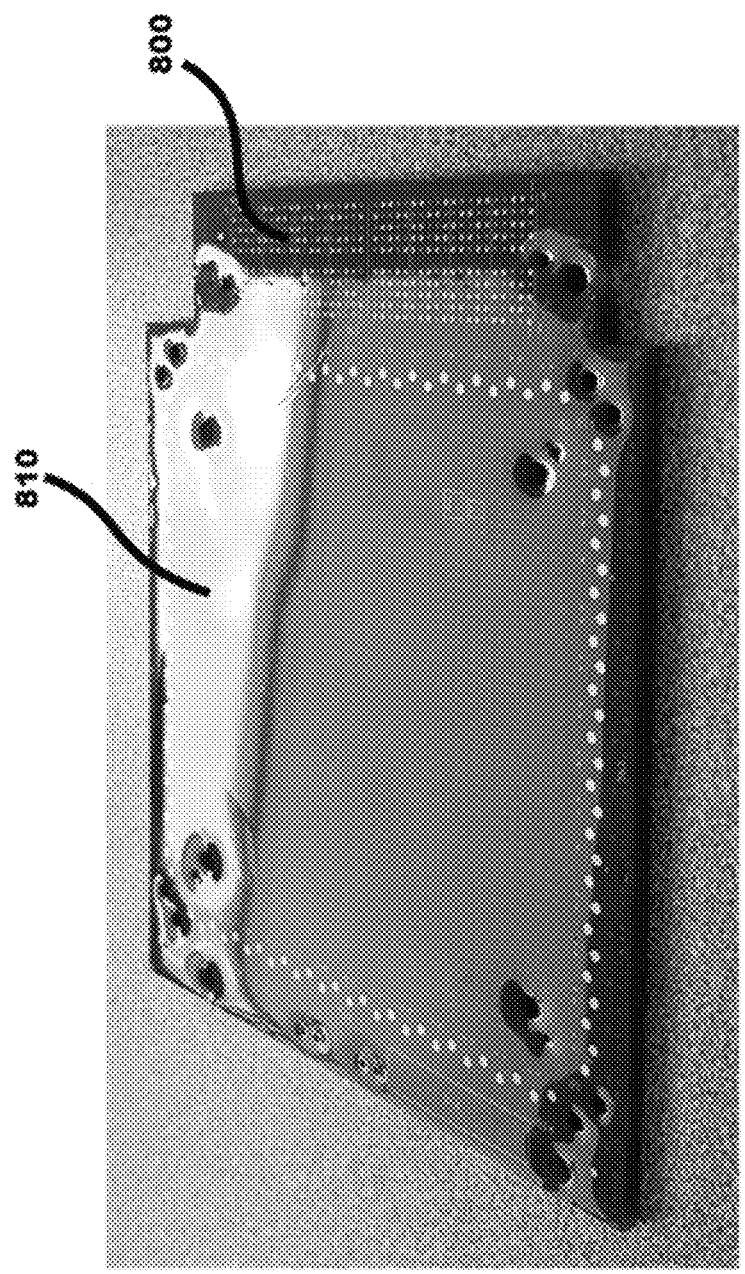
FIG. 8 shows a printed circuit board coated with a security coating of the current disclosure.
Figure 9:
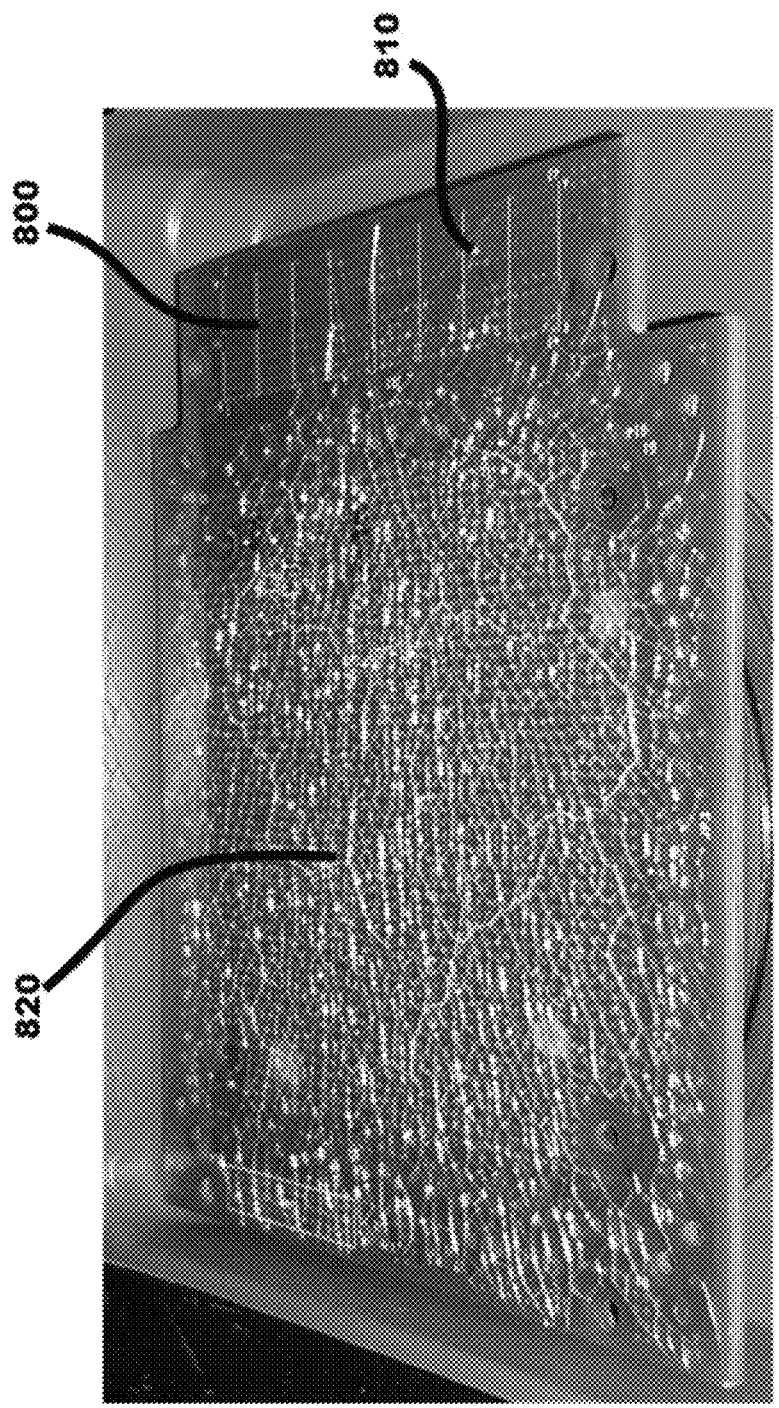
FIG. 9 shows the printed circuit board of FIG. 8 wherein security coating has crazed after an intrusion event has occurred.

FIG. 8 shows a printed circuit board 800 coated with a security coating 810 of the current disclosure. FIG. 9 shows the printed circuit board 800 wherein security coating 810 has crazed 820 after an intrusion event has occurred.

Figure 10:
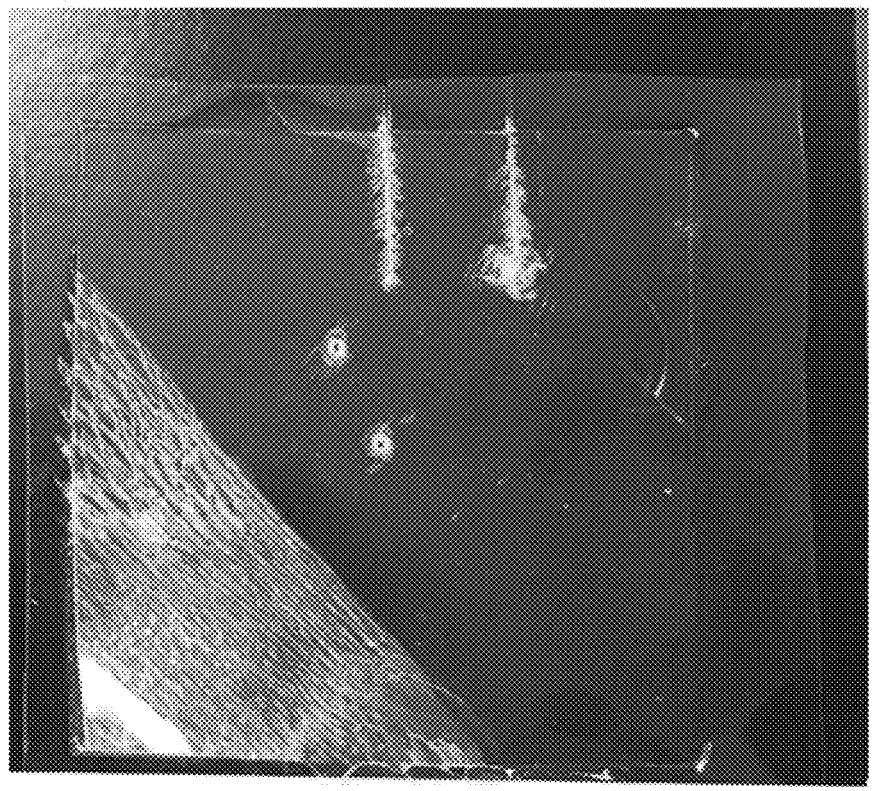
FIG. 10 shows a frangible layer between 2 layers of PET showing crazing after different methods of intrusion invents have occurred.
Figure 11:
FIG. 11 shows a prior art commercial cup and loop security seal.

FIG. 10 shows a Flex & Frange™ example after several intrusion events have occurred. In this embodiment, a frangible layer that is 360 μm thick is sandwiched between 2 layers of PET. After curing, the sample became a flexible substrate which could be used for packaging which detects intrusions as evidenced by the crazing which occurred during intrusion events such as penetration, cutting, and attempted delamination.

The current disclosure's Frangible Authentication Security Tag (FAST™ seals) is based on a structural and optical PUF wherein a polymer, in one case an acrylate, potting material in a frame's reservoir cracks in a non-predetermined pattern that is unique for each seal and possesses unique physical and optical features. Other materials that may be used instead of, or with, the acrylate are methacrylates, and waxes and epoxies. The physical features of the cracks are three dimensional (3D) running along and through the X, Y and Z axes or planes. This provides more complexity than a simple two-dimensional (2D) pattern simply running along and through the X and Y axes or planes or the complexity provided by a code or image.

The optical characteristics of the transparent material combined with the unique crack pattern results in a lensing effect that bends transmitted light differently for each seal and, additionally, depends on the angle and distance from the light source at which it is viewed.

Figure 24:
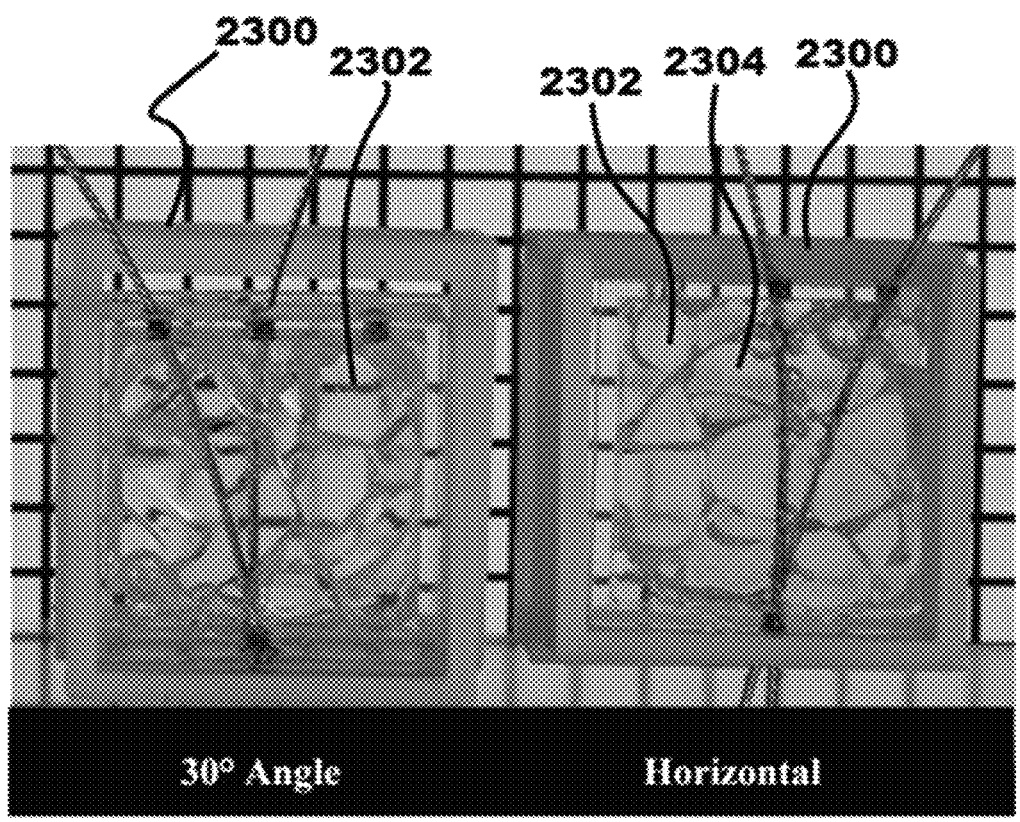
FIG. 24 shows a photograph of one embodiment of an authentication device illustrating the haze effect that can be generated in authentication devices of the current disclosure.

The FAST seals of the current disclosure also have a unique feature wherein the seal is translucent but hazy when viewed from an angle that is perpendicular to the window (face) surface of the seals but the seal becomes transparent and significantly less hazy when viewed from an oblique angle. This provides an additional level of authentication for the seals of the current disclosure. Combining these features enables both 2D and 3D authentication schemes to be employed with simple detection technologies like a cell phone camera instead of requiring advanced systems such as rastered laser scanning. If desired, the FAST seals are compatible with dispersed reflective particle technology. FIG. 24 shows a photograph of one embodiment of an authentication device 2300 viewed from a 30° angle with respect to face surface 2302, which shows the authentication device as clear or translucent. FIG. 24 also shows authentication device 2300 viewed perpendicular to face surface 2302 of the authentication device, wherein authentication device 2300 is hazy in appearance 2304.

Another issue that the security device of the current disclosure addresses is cutting and replacing of the wire just inside the frame of the seal. Because the frames can be made of transparent material, it makes end-to-end inspection over the length of the wire possible. Tempered glass cup seals may be used for this purpose; however, polymer seals are much lighter and do not have the potential to shatter like tempered glass.

Unique to this type of seal is that the PUF authentication material is also used as the adhesive/locking mechanism for the wires; therefore, any attempts to remove the wires from the seal will destroy the PUF's structure and indicate tampering. In other words, the authentication features are directly tied to the tamper-indicating features.

Figure 21:
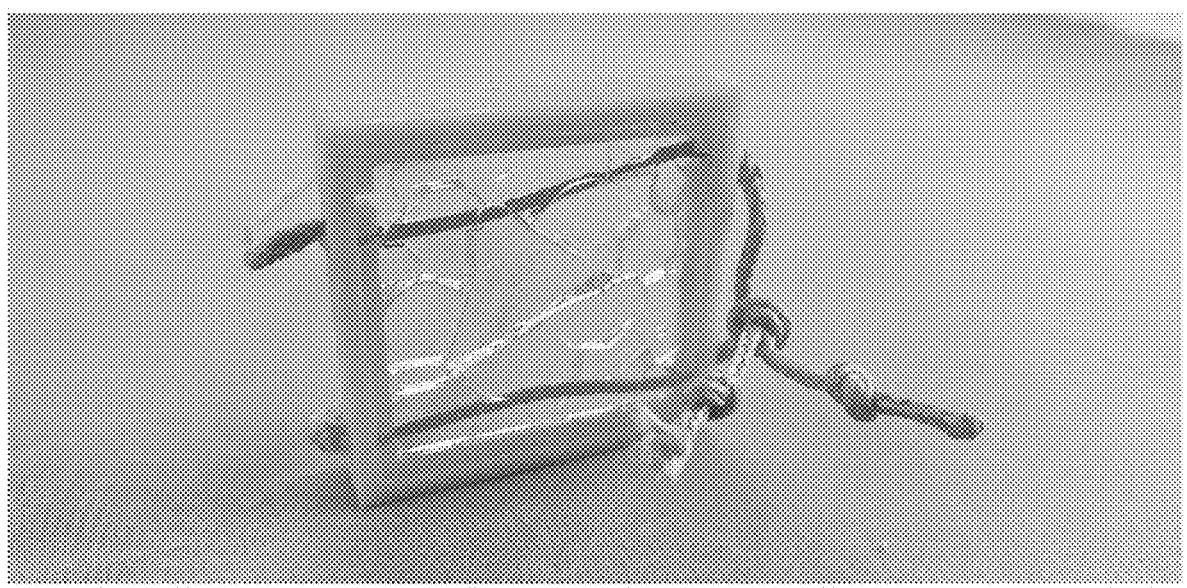
FIG. 21 is yet another alternate view of FIG. 19.

The authentication tag may be employed with, but is not limited to, cup-and-loop type applications wherein an owner such as a manufacturer, producer, supplier, seller, brand owner, etc., can apply a unique tag to an item of value such as a product, valuable, electronic component or system, antiquity, etc., to provide evidence to a consumer that the item of value is authentic. This technology will be a higher security analogue to traditional, low-security commercial cup and loop seals, as shown in FIG. 21.

Figure 12:
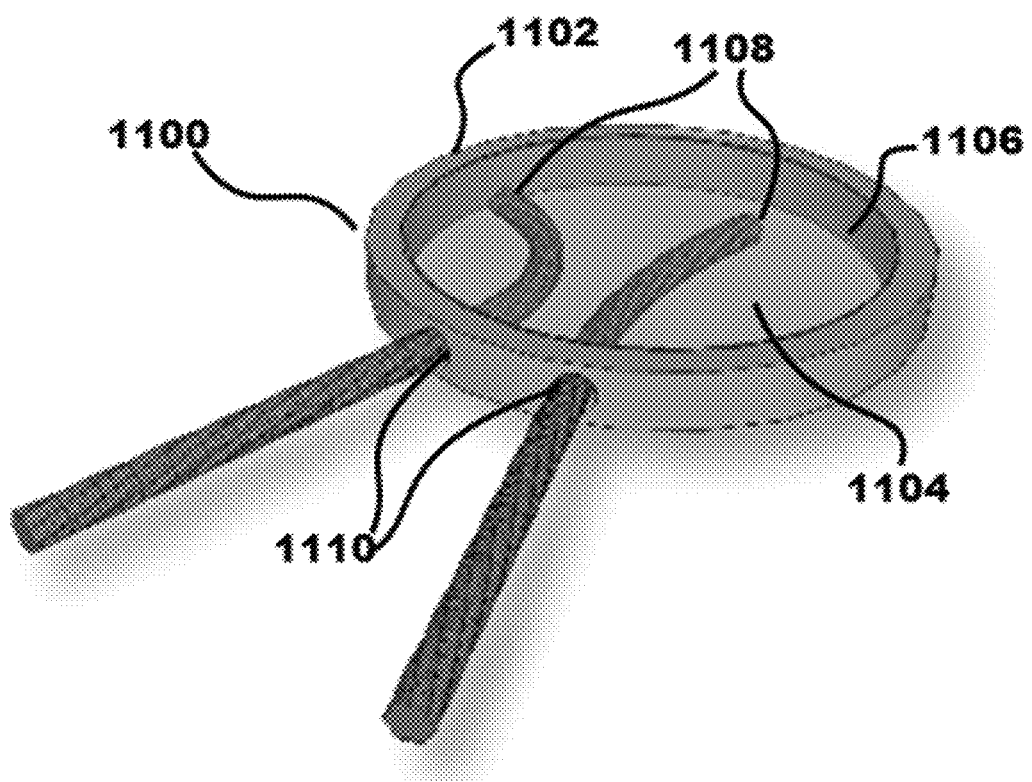
FIG. 12 shows an uncured authentication device of the current disclosure.
Figure 13:
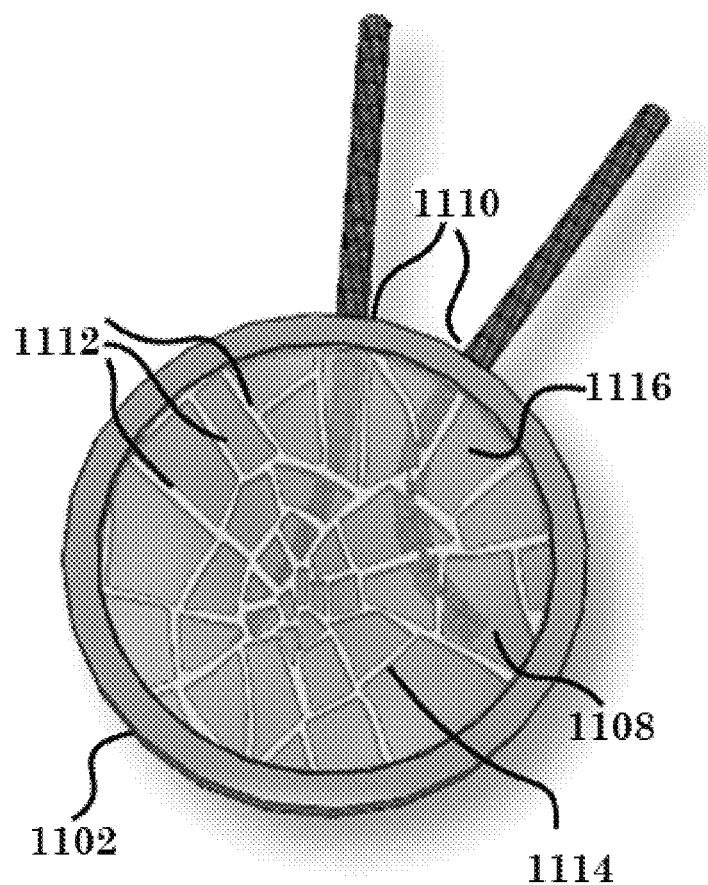
FIG. 13 shows a cured authentication device of the current disclosure displaying a franged identification scheme.

FIG. 12 shows an authentication tag 1100 of the current disclosure in an uncured state. The authentication tags developed by the current disclosure are comprised of a frame 1102 that has an internal reservoir 1104 which is filled with uncured polymer 1106, which in one example may be an acrylate, that becomes frangible or franges upon curing; the ends 1108 of a security loop, such as a wire, string, cable, etc., are inserted into frame 1102 through openings 1110 and submerged in uncured polymer 1106. The ends of 1108 may be left apart or connected by twisting, tying, soldering, etc. Uncured polymer 1106, which may be a monomer, may then cured via a UV radiation source, or other curing mechanisms as known to those of skill in the art, not shown, until the hardened polymer cracks catastrophically or auto-franges, producing cracks 1112 and pattern 1114 in cured polymer 1116, see FIG. 13, which shows a cured authentication device of the current disclosure displaying a franged identification scheme.

Figure 14:
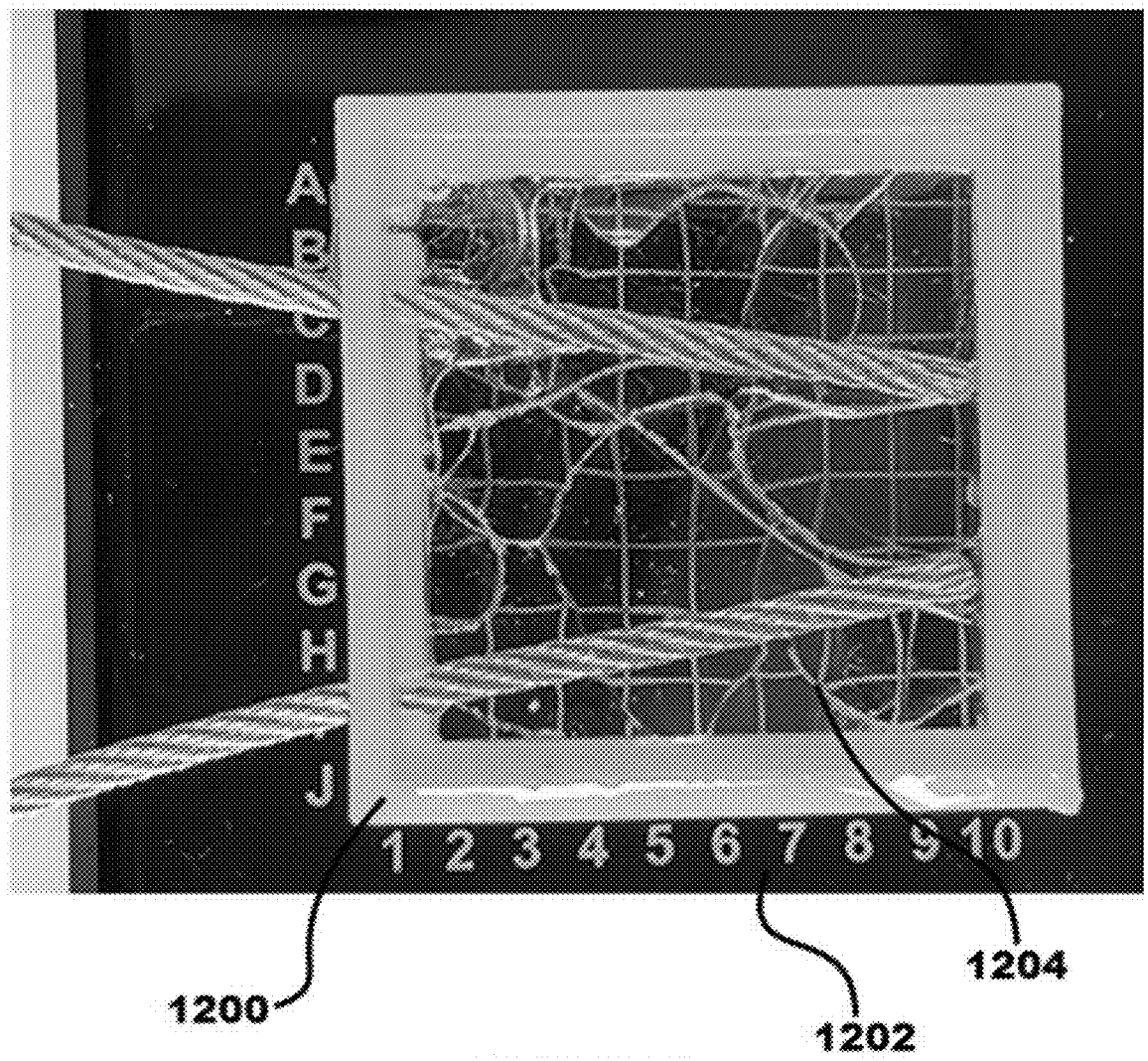
FIG. 14 shows one embodiment of a frangible authentication security tag on a regular 90° grid pattern.

The cured polymer, which may be an acrylate, acts as a potting material for the ends of the wire to lock them in and help prevent unauthorized removal. Auto-franging of the acrylate creates a unique, three-dimensional, chaotic crack pattern through the entire thickness of the seal which serves as a unique ID for authentication. The cracking process in the transparent frangible materials creates unique lensing effects for light as it travels through the seal; therefore, each seal will distort transmitted light in a unique way based on the thickness, crack pattern, and refractive index of the polymer and windows, as well as the distance of the seal from the transmitted image or light source during authentication. FIG. 14 shows one embodiment of a frangible authentication security tag 1200 on top of a regular 90° grid pattern 1202, illustrating the optical lensing effect of the cracked polymer 1204 on the transmitted light.

Replication of the seal requires that the crack thicknesses, angles, edges, depth, and interaction with the inserted wires be reproduced as well as the refractive index, shapes, and light distortion properties of the frangible material be reproduced. In a further embodiment, the material and frame could all be transparent which allows the security wires to be inspected for damage from any angle. Additionally, removal of the wires or cutting and gluing the wires back together at the edge of the frame is more difficult to hide with a transparent frame and seal material.

Also, removal of the wires from a polymer such as acrylate is difficult to do mechanically, but, even if successful, significantly disrupts the polymer network surrounding the wires and creates either additional franging or smoothing of the polymer walls around the wires. Both of these indicators are easy to see with the naked eye. In addition, a lightweight braided wire is very difficult to insert back into the polymer to attempt spoofing.

Transparent materials also enable the use of dispersed optical indicators such as dyes, metal particles, pigment particles, or other randomly-distributed authentication features to create greater complexity in the seal designs. Further, the frangible materials will create new cracks as a tamper-indicating mechanism in the event of unauthorized intrusion. The cured polymer creates a physical barrier, a random unique ID, and a 3D optical tamper-indicating pattern that can be used to authenticate an item of value.

Where the current disclosure is formed into a seal, but the current disclosure is not so limited and should not be read as construed simply to seals as other physical formats such as moldings, flat panels, shaped bands, etc., are all considered within the scope of the disclosure, the seals are designed such that an inspector, Quality Control Manager, Authentication Manager, Logistics Manager, etc., can apply the tags to a given object in the field. The seals will be pre-loaded with the monomer, which may be an acrylate, or the polymer can be added after the wires are inserted. The curing may be accomplished with a light source curing device that could comprise a clam-shell type closure that may have integrated battery power and UV LEDs that are used to cure and auto-frange the FAST™ seals tags.

Figure 15:
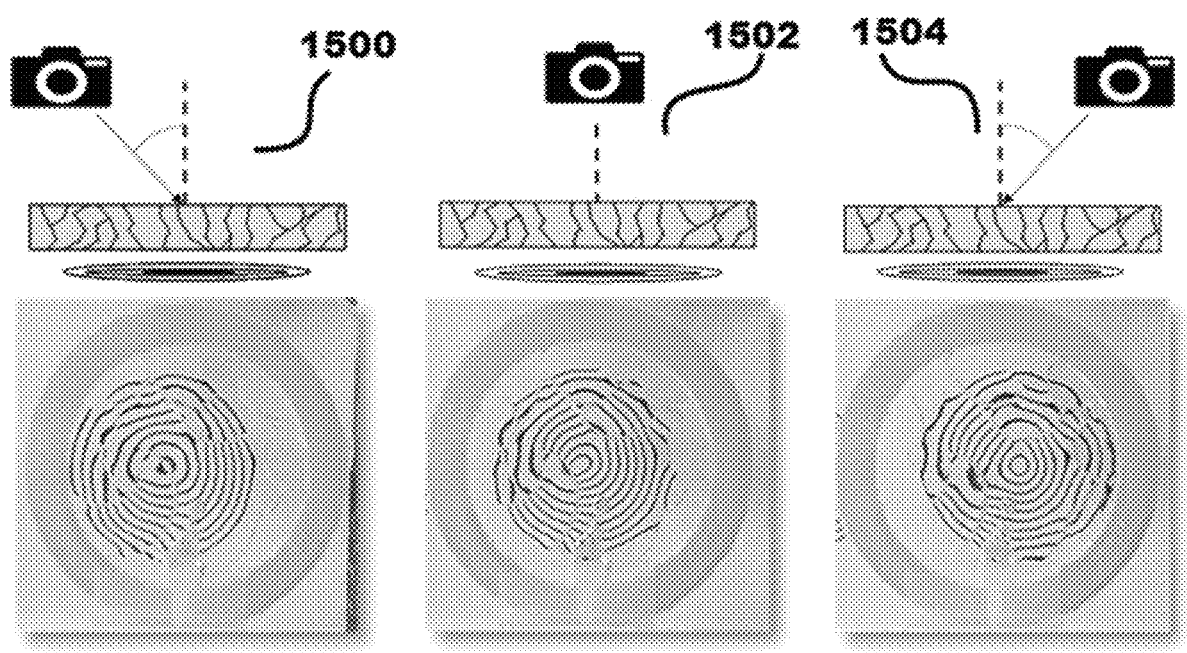
FIG. 15 shows an example of a distorted fingerprint image analysis through a franged device of the current disclosure.

The curing device could also incorporate imaging capabilities that could be used to store an image of the seal after it has been auto-franged. The image could be stored in a database and used for two-factor authentication of the seal at a later time. The lensing effect of the seals may be utilized during the imaging step as well. Randomized fingerprint images may be used as backgrounds during the imaging step, creating a random distortion of the fingerprint image as a secondary two-factor authentication token. FIG. 15 shows an example of a distorted fingerprint image analysis through a franged device of the current disclosure. The orientation, distance, lighting and background image could all be fixed when the seal is placed in the reader for the curing step. Additionally, taking images at multiple angles, 1500, 1502, and 1504, would increase the difficulty of reproducing the tag. Simple flicker analysis can also be used to compare a seal image to a reference image to check for differences in the cracking pattern as well.

Figure 16:
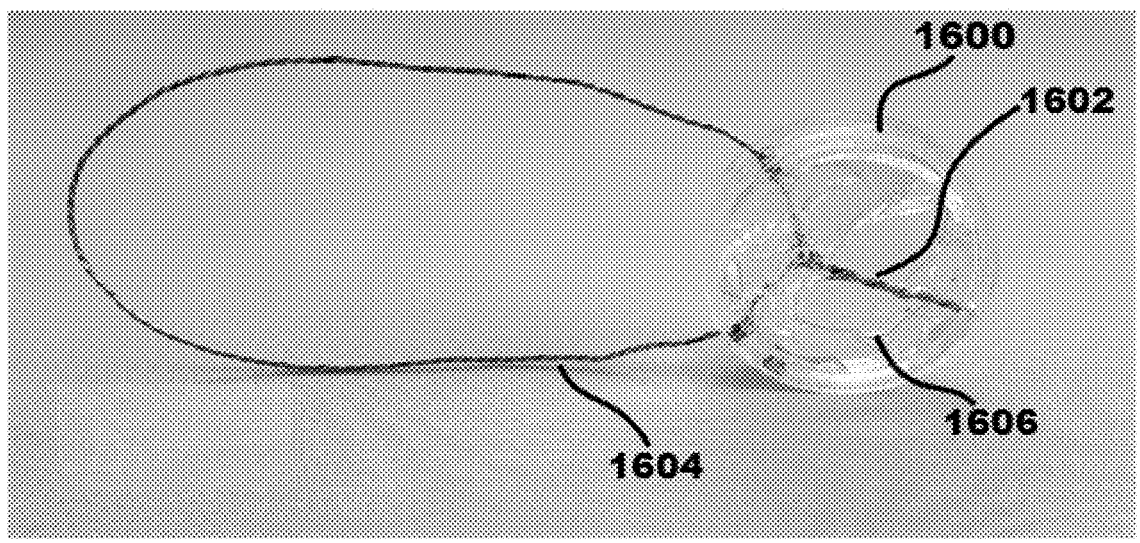
FIG. 16 shows one embodiment of a transparent polymer frame with polymer cured inside, securing a metal wire loop like a potting material.
Figure 17:
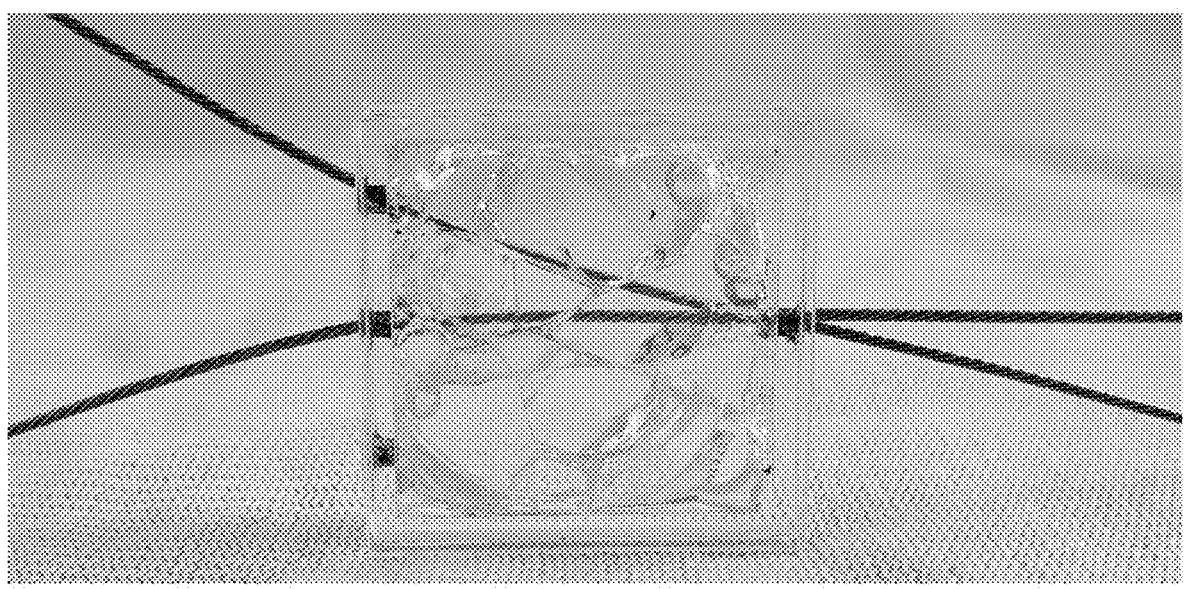
FIG. 17 shows another embodiment of a transparent polymer frame with polymer cured inside.
Figure 18:
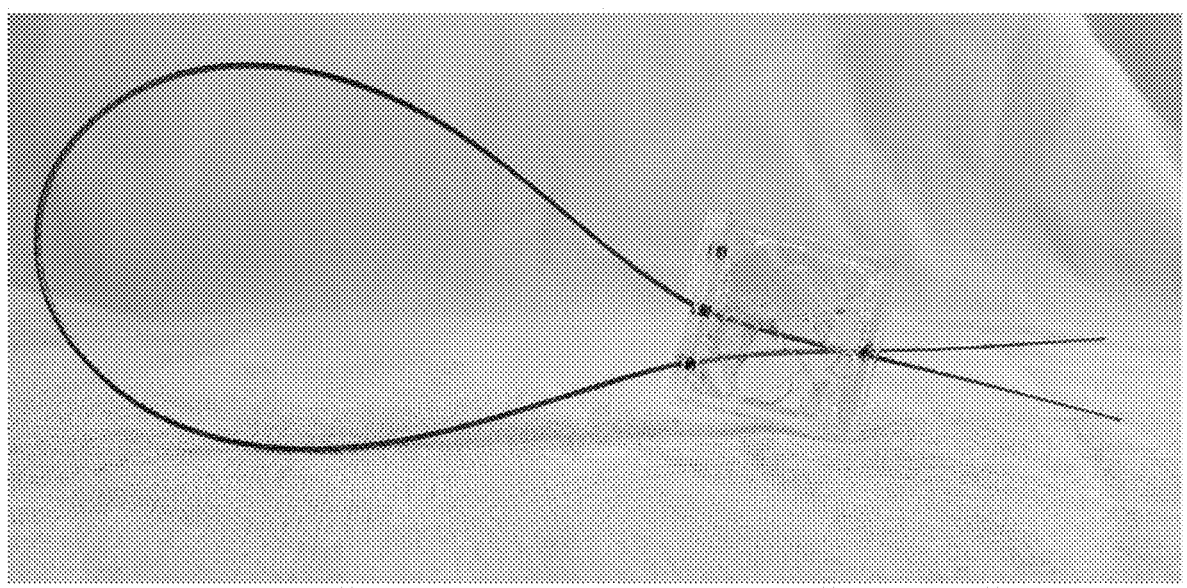
FIG. 18 shows yet another embodiment of a transparent polymer frame with acrylate cured inside.

FIGS. 16, 17 and 18 show a transparent polymer frame with SR350 acrylate cured inside 1600, securing the metal wire loop like a potting material. The holes in the frames were hot-drilled, so the walls of the holes appear black, but if they were cold-drilled, even the through-holes would be transparent as well. Also, FIG. 16 illustrates the method of creating a twist 1602 inside of the acrylate prior to cure, making it much more difficult to remove the wire 1604 without disturbing or further cracking frangible material 1606 and indicating a tampering event.

Figure 19:
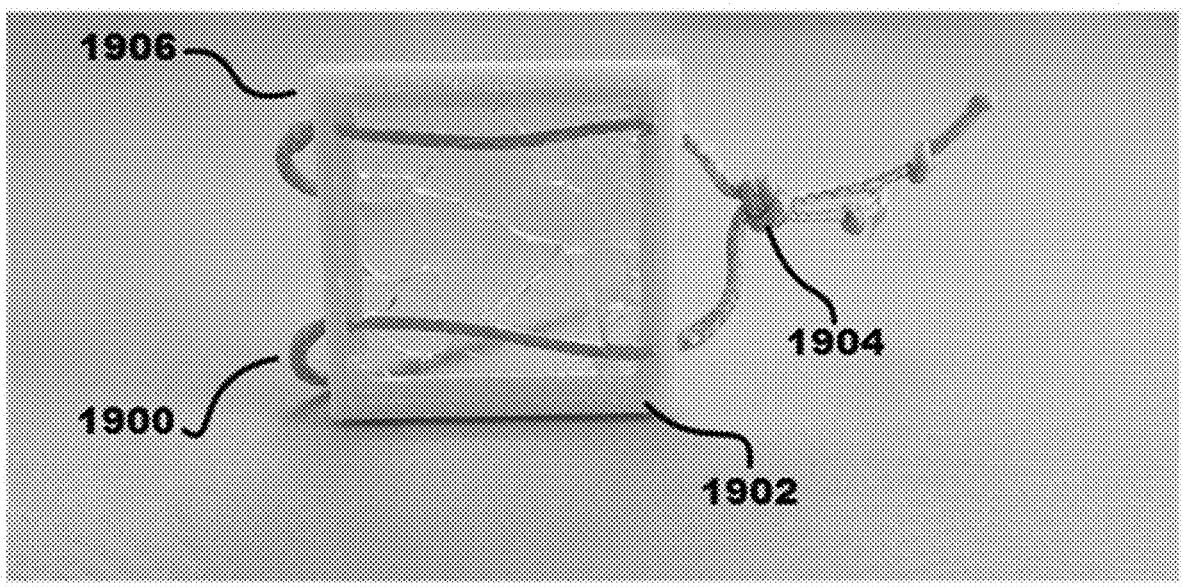
FIG. 19 shows an embodiment of the current disclosure formed using alternative materials.
Figure 20:
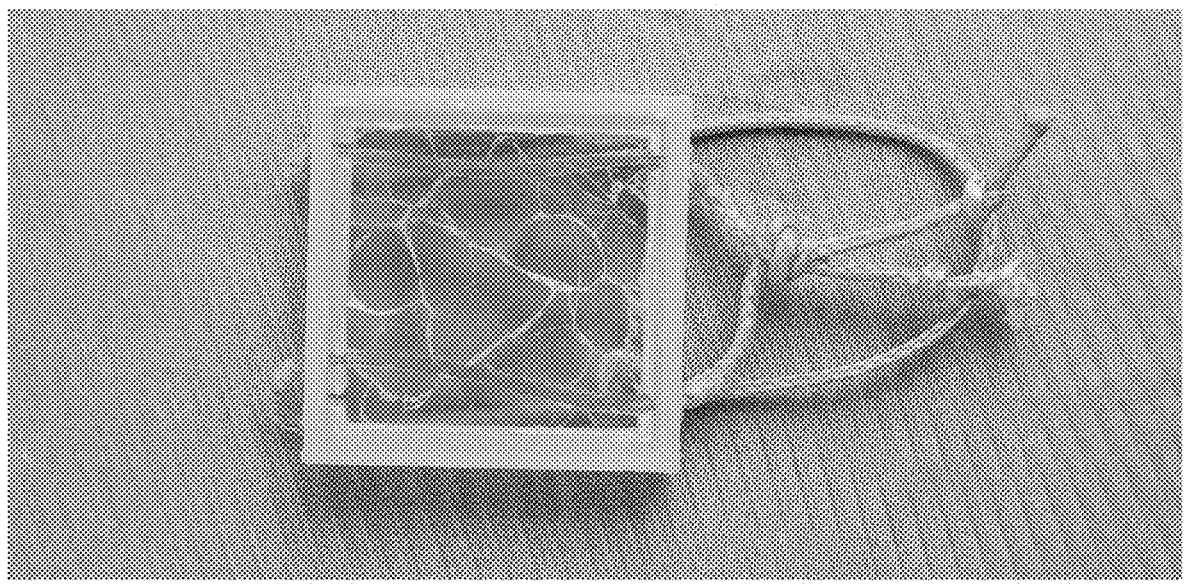
FIG. 20 is an alternate view of FIG. 19.

FIGS. 19, 20, and 21 illustrate the use of other types of loop materials 1900, for example, heavy braided fishing line, as well as opaque or colored frame materials 1902. Tying a knot 1904 on the opposite side of the FAST™ seals 906 enables the tags to be cinched tight onto the item of value before curing. This makes the tags easier to install.

Figure 22:
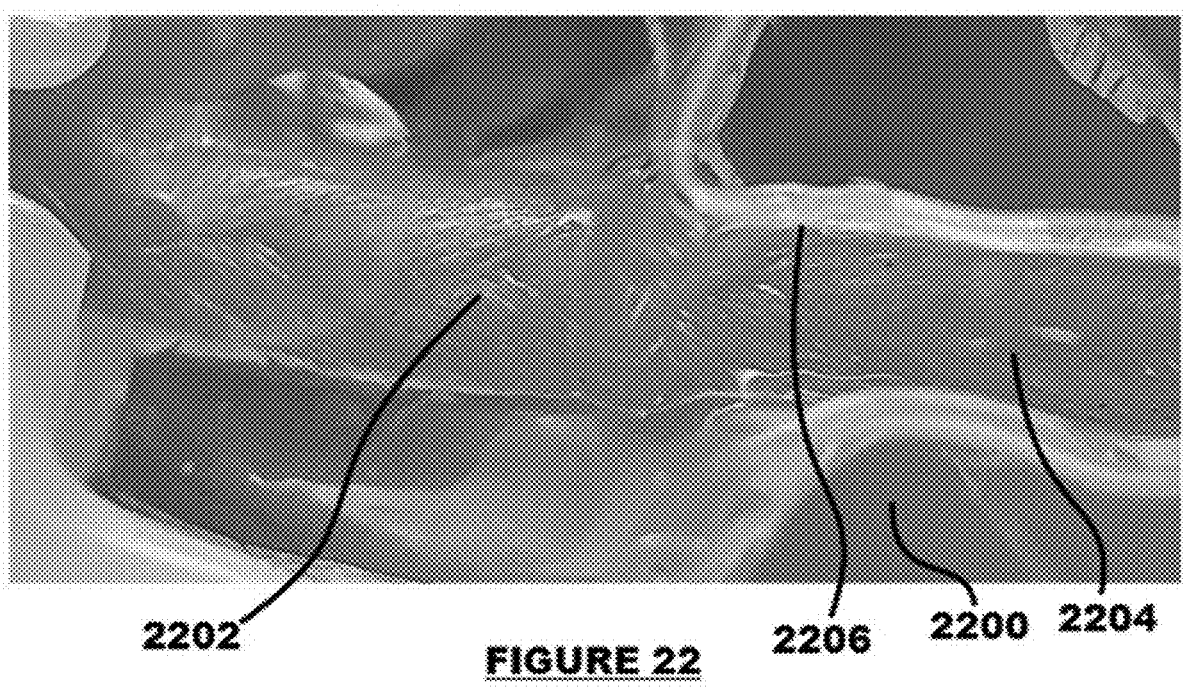
FIG. 22 shows how the polymer material interdigitates with the components of the device.
Figure 23:
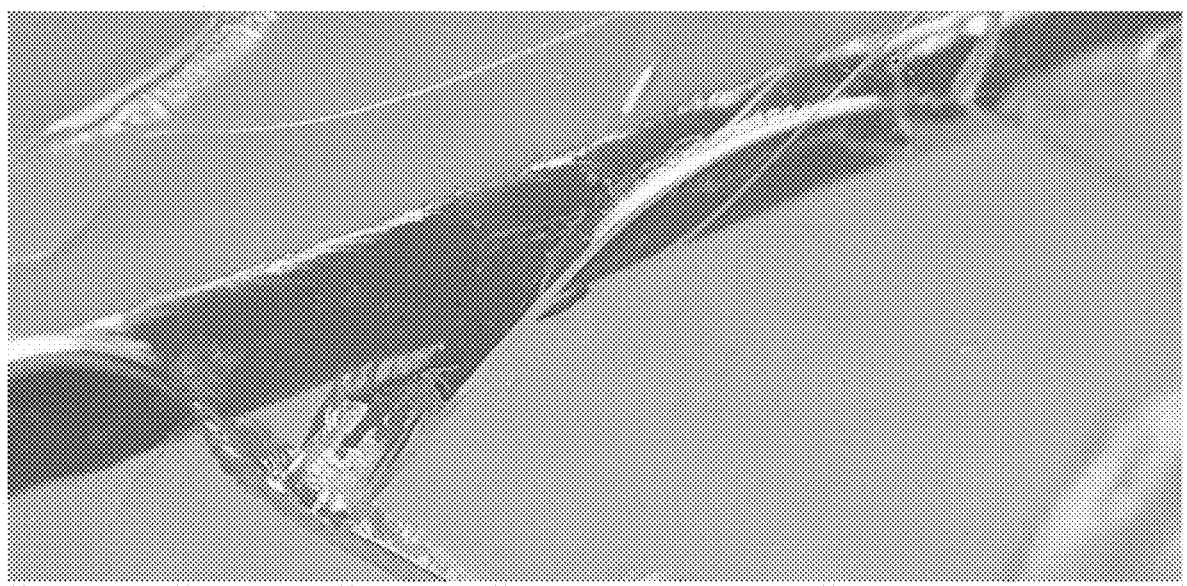
FIG. 23 is a further image showing interdigitation of the device.

FIGS. 22 and 23 show how the polymer material 2200, here acrylate, interdigitates 2202 with the wires 2204, creating a conformal coating 2206 on the texture of the trapped fibers/wires 2204. This makes interrogation of the tags easier because if the wires have been ripped out, they destroy the fine structure of the cured acrylate that is in direct contact with the wires and thereby indicates tampering.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. An authentication device comprising:
   a frame;
   an internal reservoir disposed within the frame;
   an uncured polymer or monomer disposed within the internal reservoir wherein the polymer or monomer is subsequently cured to render the cured polymer solid and frangible;
   at least one end of a security loop disposed within the uncured polymer or monomer; and
   a cracked three dimensional identification scheme formed in the cured polymer due to curing the polymer causing cracks to form in the cured polymer.

2. The device of claim 1, wherein the cracked three dimensional identification scheme distorts light shown upon the cured polymer.

3. The device of claim 1, wherein removal of the at least one end of the security loop disposed within the cured polymer will change the three dimensional identification scheme pattern in the cured polymer of the device.

4. The device of claim 1, wherein the frame is transparent.

5. The device of claim 1, wherein dyes, metal particles, pigment particles, or combinations of same are dispersed randomly in the polymer or monomer prior to curing to form randomly-distributed authentication features dispersed within the cured polymer.

6. The device of claim 1, wherein the cured polymer is intertwined with a structure of the at least one end of the security loop.

\* \* \* \* \*

UNITED STATES PATENT AND TRADEMARK OFFICE
CERTIFICATE OF CORRECTION

| | |
|---|---|
| PATENT NO. | : 11,347,901 B2 |
| APPLICATION NO. | : 16/021185 |
| DATED | : May 31, 2022 |
| INVENTOR(S) | : Jeffrey R. DiMaio et al. |

It is certified that error appears in the above-identified patent and that said Letters Patent is hereby corrected as shown below:

In the Specification

The government support clause reads as follows:
This disclosure was developed with the use of research funds from the Department of Energy ("DOE") pursuant to Grant Number DE-SC0008246 and Grant Number DE-NA0002805, both titled "Development and Commercialization of Nanocomposite Coating Technologies". The government has certain rights in the invention.

It should read:
This invention was made with government support under DE-SC0008246 and DE-NA0002805, awarded by the U.S. Department of Energy. The government has certain rights in the invention.

Signed and Sealed this
Fourteenth Day of February, 2023

Katherine Kelly Vidal
*Director of the United States Patent and Trademark Office*